United States Patent
Ostrovsky et al.

(10) Patent No.: US 11,240,897 B2
(45) Date of Patent: Feb. 1, 2022

(54) TWO-WIRE DIMMER OPERATION

(71) Applicant: Leviton Manufacturing Co., Inc., Melville, NY (US)

(72) Inventors: Michael Ostrovsky, Brooklyn, NY (US); Alan Neal, Fountain Hills, AZ (US); Alfred Lombardi, Syosset, NY (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 0 days.

(21) Appl. No.: 17/125,792

(22) Filed: Dec. 17, 2020

(65) Prior Publication Data

US 2021/0105882 A1 Apr. 8, 2021

Related U.S. Application Data

(63) Continuation of application No. 16/721,033, filed on Dec. 19, 2019, now Pat. No. 10,904,984, which is a (Continued)

(51) Int. Cl.
*H05B 47/105* (2020.01)
*H05B 45/37* (2020.01)
(Continued)

(52) U.S. Cl.
CPC ........... *H05B 47/105* (2020.01); *H05B 45/37* (2020.01); *H05B 45/50* (2020.01); *H05B 47/16* (2020.01)

(58) Field of Classification Search
CPC ...... H05B 47/10; H05B 47/105; H05B 47/16; H05B 47/135; H05B 45/10; H05B 45/34;
(Continued)

(56) References Cited

U.S. PATENT DOCUMENTS 5,239,255 A 8/1993 Schanin et al.
5,583,423 A 12/1996 Bangertner
(Continued)

OTHER PUBLICATIONS

Notice of Allowance in U.S. Appl. No. 16/515,222 dated Oct. 4, 2019, 13 pgs.
(Continued)

*Primary Examiner* — Haissa Philogene
(74) *Attorney, Agent, or Firm* — Matthew M. Hulihan; Heslin Rothenberg Farley & Mesiti PC

(57) ABSTRACT

Two-wire dimmer operation includes controlling conduction of power to a lighting load. In one aspect, based on a conduction angle adjustment, power supply voltage is monitored and a maximum conduction angle is established based thereon. In another aspect, a dimming level signal is received and a dimming level for a dimmer is set based on the received dimming level. The dimming level signal indicates a desired dimming level for a dimmer, and a maximum value for the dimming level signal is based on a dimmer power supply voltage. In yet another aspect, based on detecting an adjustment to increase a conduction angle of a dimmer, the conduction end angle is increased and the conduction start angle is also increased. This results in a net increase in the conduction angle for controlling operation of the dimmer.

21 Claims, 14 Drawing Sheets

Related U.S. Application Data continuation of application No. 16/515,222, filed on Jul. 18, 2019, now Pat. No. 10,568,185.

(51) Int. Cl.
*H05B 45/50* (2020.01)
*H05B 47/16* (2020.01)

(58) Field of Classification Search
CPC ...... H05B 45/37; H05B 45/50; H05B 45/327; H05B 39/08; H05B 39/048; H02M 1/15; H02M 1/081; H02M 5/2573; Y02B 20/40; Y10S 315/04
See application file for complete search history.

(56) References Cited

U.S. PATENT DOCUMENTS

| | | | |
|---|---|---|---|
| 7,164,238 B2 | 1/2007 | Kazanov et al. | |
| 7,242,150 B2 | 7/2007 | DeJonge et al. | |
| 7,339,331 B2 * | 3/2008 | Vanderzon | H02H 3/253 |
| | | | 315/291 |
| RE42,425 E | 6/2011 | DeJonge et al. | |
| 7,973,589 B2 | 7/2011 | Rothenberger | |
| 8,115,419 B2 | 2/2012 | Given et al. | |
| 8,203,276 B2 | 6/2012 | Shackle et al. | |
| 8,410,718 B2 | 4/2013 | Anissimov | |
| 8,664,886 B2 | 3/2014 | Ostrovsky | |
| 8,796,954 B2 | 8/2014 | Zhang et al. | |
| 9,084,324 B2 | 7/2015 | Salvestrini | |
| 9,184,590 B2 | 11/2015 | Testani | |
| 9,220,144 B2 * | 12/2015 | Miyahara | H05B 45/10 |
| 9,419,435 B2 | 8/2016 | Testani | |
| 9,560,718 B2 | 1/2017 | Sadwick | |
| 10,034,353 B2 | 7/2018 | Lark, Jr. et al. | |
| 10,128,101 B2 | 11/2018 | Goscha et al. | |
| 10,225,915 B2 | 3/2019 | Harris | |
| 10,568,185 B1 | 2/2020 | Ostrovsky et al. | |
| 10,602,580 B2 * | 3/2020 | Wang | H05B 45/34 |
| 10,856,395 B1 * | 12/2020 | Jahan | G06N 3/08 |
| 10,904,984 B1 * | 1/2021 | Ostrovsky | H05B 45/50 |
| 2017/0019966 A1 | 1/2017 | Suehiro et al. | |

OTHER PUBLICATIONS

"Two-Wire Dimmer Operation", U.S. Appl. No. 16/721,033, filed Dec. 19, 2019, 85 pgs.

Office Action in U.S. Appl. No. 16/721,033 dated Jun. 26, 2020, 11 pgs.

Notice of Allowance in U.S. Appl. No. 16/721,033 dated Oct. 13, 2020, 9 pgs.

\* cited by examiner

TWO-WIRE DIMMER OPERATION

BACKGROUND

Two-wire dimmers are used for controlling lighting loads in cases where a neutral connection is not available in the junction box. The dimmer is connected electrically in-series with the load and line power is conducted to the load when a switching circuit of the dimmer is closed. When power is conducted to the load, there is no such flow of line power being provided to dimmer's electronic circuitry and therefore there is limited power available for the dimmer's electronic circuitry to operate. Consequently, two-wire dimmers typically have a minimum power requirement for the loads they operate, as operation at any lower power level will starve the dimmer of enough current to function properly.

SUMMARY

Shortcomings of the prior art are overcome and additional advantages are provided. In accordance with one embodiment, a device in the form of a dimmer is provided for controlling conduction of a supply of power to a lighting load. The dimmer includes a line input terminal and a load output terminal, the line input terminal configured to be electrically coupled to the supply of power, and the load output terminal configured to be electrically coupled to the lighting load; a switching circuit electrically coupled in series between the line input terminal and the load output terminal, the switching circuit configured to be selectively controlled between an ON state, in which the switching circuit conducts the supply of power to the lighting load, and an OFF state; and a controller. The controller is configured to perform: based on detecting an adjustment to increase a conduction angle of the dimmer, the conduction angle corresponding to a conduction time of the switching circuit to conduct the supply of power to the load, adjusting parameters of the selective control of the switching circuit, the adjusting increasing the conduction angle; concurrent with the adjusting, monitoring a voltage of a power supply of the dimmer, the voltage initially being substantially a first voltage; based on the monitoring detecting that the voltage falls from substantially the first voltage to a second, lower voltage, establishing a maximum conduction angle for the dimmer, the maximum conduction angle being a function of (i) the conduction angle of the dimmer when the voltage is detected to have fallen to the second voltage and (ii) an offset; and controlling operation of the dimmer using the established maximum conduction angle.

In accordance with another embodiment, a device is provided in the form of a dimmer for controlling conduction of a supply of power to a lighting load. The dimmer includes a line input terminal and a load output terminal, the line input terminal configured to be electrically coupled to the supply of power, and the load output terminal configured to be electrically coupled to the lighting load; a switching circuit electrically coupled in series between the line input terminal and the load output terminal, the switching circuit configured to be selectively controlled between an ON state, in which the switching circuit conducts the supply of power to the lighting load, and an OFF state; a controller; and a dimming level adjustment circuit electrically coupled between a dimmer power supply voltage and the controller of the dimmer, where the dimming level adjustment circuit is configured to provide a dimming level signal to the controller, the dimming level signal indicating a desired dimming level for the dimmer, where a maximum value of the dimming level signal, and therefore a maximum configurable desired dimming level for the dimmer, is based on the dimmer power supply voltage, and where the controller is configured to perform: receiving the dimming level signal from the dimming level adjustment circuit; and setting a dimming level for the dimmer based on the received dimming level signal.

In accordance with yet another embodiment, a device is provided in the form of a dimmer for controlling conduction of a supply of power to a lighting load. The dimmer includes a line input terminal and a load output terminal, the line input terminal configured to be electrically coupled to the supply of power, and the load output terminal configured to be electrically coupled to the lighting load; a switching circuit electrically coupled in series between the line input terminal and the load output terminal, the switching circuit configured to be selectively controlled between an ON state, in which the switching circuit conducts the supply of power to the lighting load, and an OFF state; and a controller. The controller is configured to perform: selectively controlling the switching circuit between the ON state and the OFF state to control dimming operation of the dimmer according to a conduction angle corresponding to a conduction time for the switching circuit to conduct the supply of power to the load during each half-phase of a plurality of half-phases of the supply of power, the conduction angle defined by a conduction start angle and a conduction stop angle, the conduction start angle being an angle of the half-phase at which the switching circuit is switched to the ON state to conduct the supply of power to the lighting load, and the conduction end angle being an angle of the half-phase at which the switching circuit is switched to the OFF state to cease conducting the supply of power to the lighting load; based on detecting an adjustment to increase the conduction angle, adjusting the selective control of the switching circuit, the adjusting including: increasing the conduction end angle from a first conduction end angle to a second conduction end angle greater than the first conduction end angle; and increasing the conduction start angle from a first conduction start angle to a second conduction end angle greater than the first conduction start angle, where the increasing the conduction end angle and the conduction start angle results in a net increase in the conduction angle; and controlling operation of the dimmer based on the adjusting.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

As noted, a conventional two-wire dimmer operates properly when the load draws some minimum level or power. This requirement did not present an issue when relatively high-power incandescent lighting loads were more widely used but presents challenges now that light-emitting diode (LED) lights are popular. LED lights are more efficient and can produce an acceptable light output at a relatively lower power rating—10-12 watts (W) in many applications, and potentially as low as 4 W, as an example.

The majority of two-wire dimmers use phase cut control, for instance "forward phase control" (aka "forward dimming") or "reverse phase control" (aka "reverse dimming"). Under phase cut control, the power supply of the dimmer receives power at times when the switching device used to control brightness of the lighting load, for instance the triode for alternating current (TRIAC) or transistor, is not conducting. A higher dimming level ("brightness") setting on the dimmer for powering the load results in a greater conduction time, therefore less time that the dimmer's internal power supply has an available input voltage. This results in the dimmer harvesting less power.

In conventional practice, the maximum conduction angle for a TRIAC or transistor had been set constant by-design regardless of the load type being used with the dimmer in its particular application. With small loads or lower power level voltage, the dimmer may stop operating properly (or at all) when a user adjusts the dimmer to the maximum brightness level.

Figure 1:
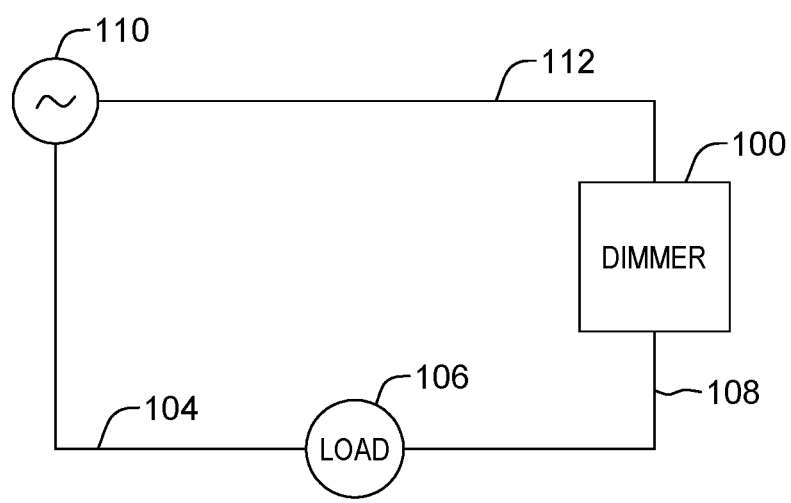
FIG. 1 depicts an example of a dimming system including a two-wire dimmer.

For context, FIG. 1 depicts an example of a dimming system including a two-wire dimmer. Two-wire dimmer 100 is shown, whereby current travels from AC source 100 via phase line 112 through dimmer 100 and through load 106 via load wire or line 108 to AC source 110 via neutral wire or line 104.

The dimmer 100 includes a circuit to control the power delivered to the load 106 by "chopping" the current coming from AC source 110. A controller/microcontroller may operate a power switch to regulate the power delivered to the load using a phase control technique. The AC source has a sinusoidal waveform that oscillates through cycles. More specifically, each sinusoidal cycle is referred to as a full cycle. Each full cycle includes a positive half-cycle and a negative half-cycle that complete a single full cycle, or "phase", of the AC power. The positive half-cycle begins at a first zero-crossing of the phase and ends at a midpoint zero-crossing at the midpoint of the phase. The negative half-cycle begins at the midpoint zero-crossing and ends at another zero-crossing at the end of the single phase. For common 60 Hz power, an entire AC cycle (a single cycle/phase) occurs in 1/60th of a second.

When employing forward phase dimming with a latching a power switch (e.g., a TRIAC), the power switch remains off at the beginning of an AC cycle during a delay period until the desired firing angle is reached. The TRIAC is turned on at a firing angle by applying one or more pulses to the gate of the TRIAC to connect the AC source to the load. Alternately, a constant/long duration pulse (as opposed to discrete pulses) can be supplied to the gate of the TRIAC to hold the TRIAC in a conducting state regardless of the amount of current being conducted through the load. The portion of the AC voltage waveform actually applied to the load is that portion extending from the firing time to the end of, or near the end of, the half-cycle. The portion of the AC voltage waveform applied during that portion of the AC cycle is referred to as the conduction period of the positive half-cycle. The TRIAC continues conducting power to the load during this time until it switches off at (or near) the midpoint zero-crossing. In this regard, TRIACs are self-commutating devices, meaning that they turn themselves off when the current through the device falls below a holding level after the control signal has been removed. The same process is repeated for the negative half-cycle, in which the TRIAC turns on after a delay period and turns off at (or near) the next zero-crossing. Generally, if the load is purely resistive, the current flowing through the load has essentially the same waveform as the portion of the AC voltage applied to the load, with no phase shift between the current and the voltage. Additionally, the firing delay periods for the two half-cycles of a full cycle are generally equal in duration, though they could be different.

Varying the conduction period varies the percentage of available power delivered to the load, thereby regulating the total amount of power delivered to the load. If the load is a lighting load, regulating the amount of power controls the brightness of the load.

It is understood that while other types of power switches, like metal-oxide semiconductor field-effect transistor (MOSFETs) and insulated-gate bipolar transistors (IGBTs), are similarly used to control conduction and firing angles, the controlling of these switches may be different from the manner described above, which is provided by way of example only.

Some power switches, such as transistors and relays, receive a constant gate signal during the entire conduction period. Other power switches, such as TRIACs and silicon-controlled rectifiers (SCRs), have regenerative switching properties that cause them to latch in the conductive state in response to short gate pulse(s) if the load current exceeds a latching level. Once in the conductive state, the power switch remains conductive—even if the control signal is removed—until the current through the switch drops below a holding level. At that point, the power switch automatically switches off. This typically occurs when the load current drops below the holding level at or near a zero-crossing.

By way of specific example, a gate pulse may be used for a transistor or other power switch requiring a continuous gate pulse during the entire conduction period. Thus, the gating operation consumes power during the entire conduction period. This technique can be, and in some instances is, used to maintain a latching power switch such as a TRIAC or SCR in a conducting state when there may otherwise not be enough current to do so.

In examples where only a short gate pulse is used to trigger a TRIAC or SCR and latch for substantially the remainder of the half-cycle, the gating operation consumes power only during a small fraction (duration of the short gate pulse) of the conduction period, thereby reducing the overall power consumption.

A short gate pulse gating technique may work adequately with a purely resistive load, however a different set of challenges is presented when used with loads having an inductive or nonlinear characteristic. Noise can appear on the current through the load leading to a misfiring. For example, the current drawn by a magnetic low-voltage (MLV) load typically does not follow the waveform of the AC source (e.g. input voltage) to the dimmer. Instead, since the current is delayed with respect to the AC voltage, a misfiring event could lead to an asymmetry in the current waveform, which causes saturation of the transformer of the MLV load and results in a large inrush of current. This is in contrast to a resistive load in which the current corresponds directly with the voltage waveform. If a short gate pulse is applied to the TRIAC during the time period between the start of the cycle and the time at which current draw begins, the MLV load may fail to turn on and/or remain on. That is, since the gate pulse is applied at a time when the MLV load draws no current, the switching device, e.g., the TRIAC, may not turn on at all, and the entire half-cycle of conduction may be missed. Alternatively, if the gate pulse is applied at a time when the load may draw some current, but not enough to latch the TRIAC in the conductive state, the load may receive power only during the duration of the gate pulse, and the result may be a short flash of light from the load, i.e., flicker. Thus, the firing angle corresponding to the time at which current draw begins could represent the limit for maximum brightness, i.e., the maximum possible conduction time.

Likewise, there is typically a firing angle corresponding to a minimum brightness close to the end of the half-cycle. If the TRIAC is gated too late, it may fail to conduct any power to the MLV load or it may only conduct during the gate pulse period if the MLV load does not draw enough current to latch the TRIAC or hold the TRIAC in the conductive state for the appropriate length of time. The result may be a flicker of light, or the lamp may turn off abruptly rather than dimming smoothly as the lower end to the dimming range is approached. Problems at the lower end of the range may be compounded by the decreasing line voltage that is available, as well as the short duration of the conduction period through the TRIAC. The above problems may also be seen with other types of loads, other than MLV.

The firing angles for minimum and maximum brightness for any given load, however, may not be known in advance. Moreover, the firing angle limits may change due to variations in operating conditions such as lamp wattage, number of lamps on the circuit, line voltage, temperature, etc., as well as variations between lamps from different manufacturers, manufacturing tolerances, etc.

One way to assure that the TRIAC will be triggered when operating near the point of maximum brightness is to continue gating the TRIAC during the entire conduction period. Then, even if the gate pulse begins before the time at which current draw begins, the continuous gating assures that the TRIAC will eventually begin conducting when the MLV load begins drawing current at the time at which current draw begins. This may, however, consume more power than the power supply can provide.

Another technique for overcoming uncertainty in the precise timing to trigger switch firing near the points of minimum and maximum brightness involves the use of multiple gate pulses. Using enough pulses over an appropriate length of time can assure that one of the pulses will trigger the TRIAC at a time when the load will draw enough current to latch. Because two-wire dimmers are limited in the amount of power they can draw through the load, use of latching power switches that can be triggered by short pulses may be adopted because it reduces the amount of power required by a controller.

The above example situations highlight just some considerations that may be appropriate to take into account when determining desired parameters for proper dimmer operation.

Figure 2:
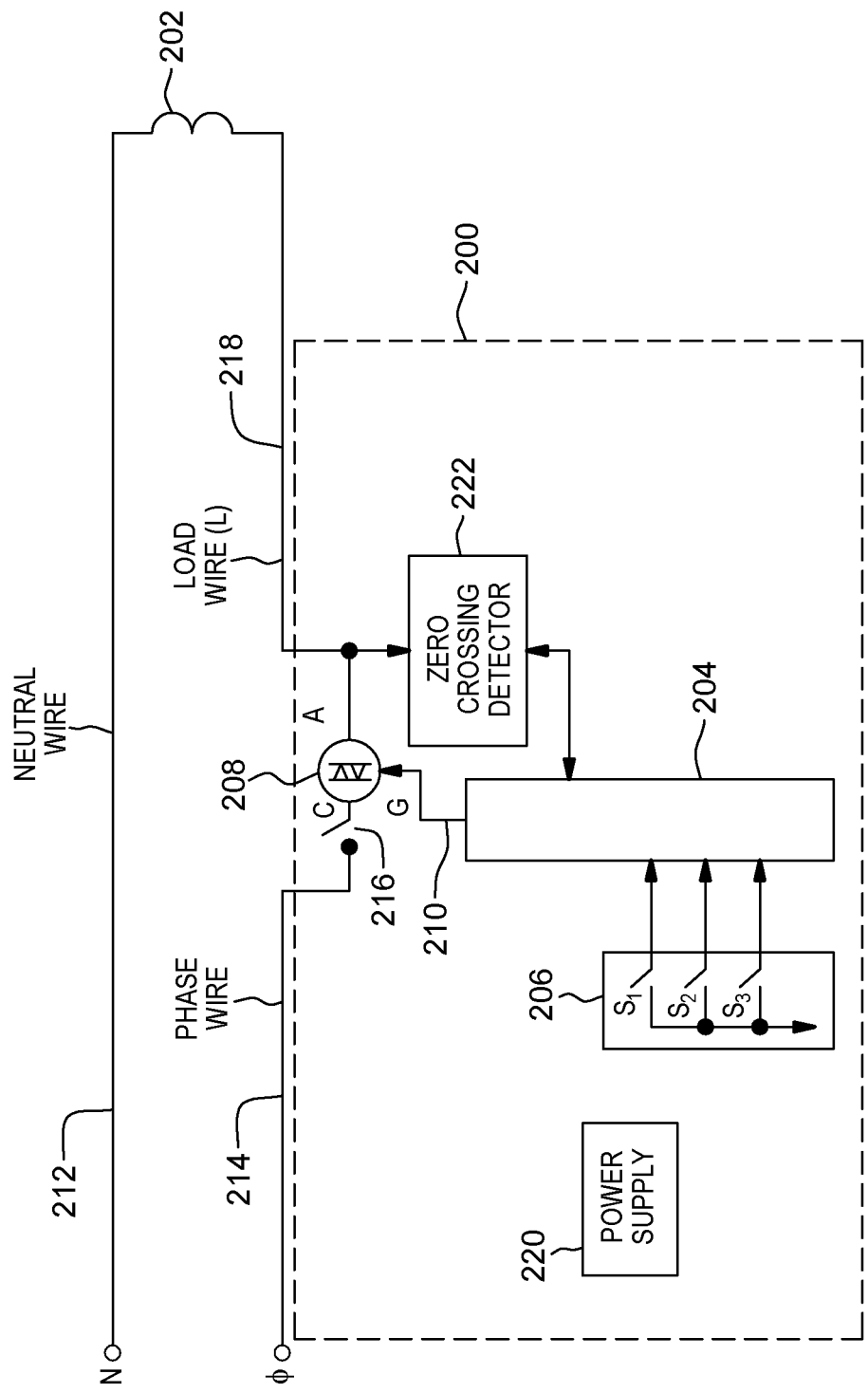
FIG. 2 depicts further details of an example two-wire dimmer.

FIG. 2 depicts further details of an example two-wire dimmer. In FIG. 2, dimmer 200 receives power from the AC source via phase wire 214 and delivers power to load 202 via load wire 218.

The dimmer includes digital control electronics and code for execution to perform various aspects, including aspects described herein. The digital control electronics and/or code can be implemented via processor(s), microprocessor(s), controller(s), microcontroller(s) (sometimes referred to collectively as "controller", "processor", "computer processor", or "processing circuit"), and the like. In the embodiment of FIG. 2, controller 204 is coupled to one or more user-accessible actuators 206. A user of dimmer 200 is able to engage or otherwise interface with actuator(s) 206 and the controller 204 may interpret this as a command or a set of commands to perform one or more actions for or relating to the delivery of power to the load 202. In response to the received command information, dimmer 200 can control delivery of power to the load 202. Example commands are those to control operation of the dimmer, for instance to control the delivery of power to the load.

Dimmer 200 can control, for example, the amount of current flowing through load 202 by tailoring the parameters activating TRIAC 208, as described above. TRIAC 208 is a bidirectional three terminal semiconductor device that allows bidirectional current flow when an electrical signal of proper amplitude is applied to its "G" (or gate) terminal via control line 210. TRIAC 208 also has a "C" (or cathode terminal) and an "A" or anode terminal. When an electrical signal is applied to the gate G, TRIAC 208 is said to be gated. When properly gated, current (or other electrical signal) can flow from the "C" terminal to the "A" terminal or from the "A" terminal to the "C" terminal. When TRIAC is not gated or is not properly gated, relatively very little or substantially no current (or no signal) can flow between the "A" and "C" terminals. TRIAC 208 thus acts as an electrically controlled power switch that can allow some or no current flow based on the amplitude of the electrical signal applied to its "G" terminal. Alternatively, the switching component of FIG. 2 (TRIAC 208) could in some examples be implemented as two TRIACs TR1 and TR2, where TRIAC TR1 is controlled by controller 204, which applies a fire signal onto control line 210 to turn on TRIAC TR2, which in turn gates TRIAC TR1 allowing an AC signal to pass through load 202 and back to the AC source via neutral wire 212.

Connected in series to TRIAC 208 is mechanical switch 216. Mechanical switch 216 can be an "air gap switch" that can be activated to stop current flow through the dimmer 200, thus stopping current flow through the load wire 218, load 202 and neutral wire 212. Mechanical switch 216 disconnects power to the dimmer 200 as a whole and load 202 to permit servicing and/or replacement of a light bulb, etc. TRIAC 208 can be gated to provide current amounts related to intensities of load 202 (for example intensity of the light if load 202 includes a lighting element, fan speed if light 202 includes a fan, etc.) or can be gated to provide substantially no current, thus essentially switching off load 202.

Power supply 220 is provided to power operation of component(s) of dimmer 200. Power supply may receive power from the phase line 214, in one example. The power supply 220 may power, for instance, operation of controller 204. The controller 204 can be coupled to and communicate with a zero-crossing detector circuit 222. The zero-crossing detector circuit 222 outputs a ZC signal. The controller 204 can use the ZC signal for various timing functions, such as the proper timing of pulses/signals that the controller 204 generates to control TRIAC 208.

An example dimmer to incorporate and/or use aspects described herein and control conduction of a supply of power to a lighting load can therefore include a line input terminal and a load output terminal, with the line input terminal configured to be electrically coupled to the supply of power, and the load output terminal configured to be electrically coupled to the lighting load as described above. The dimmer can also include a switching circuit that is electrically coupled in series between the line input terminal and the load output terminal, and is configured to be selectively controlled between an ON state and an OFF state. Additionally, the dimmer can have a controller that includes a processing circuit and includes, or is in communication, with some form of memory/storage, where the memory is to store instructions for execution by the processing circuit to perform actions described herein. In this regard, the dimmer may be a special case of a computer system capable of executing program instructions to perform processes/methods.

In other embodiments, a computer system to perform aspects described herein may take on a more typical form, such as that of a hosted server system or a user mobile device. Thus, processes as described herein may be performed by one or more computer systems, such as those described herein, which may include one or more dimmers/dimming systems and/or one or more computer systems of or connected thereto, such as one or more cloud servers, one or more user personal computers such as a smartphone, tablet, or other device, and/or one or more other computer systems.

Although various examples are provided, variations are possible without departing from a spirit of the claimed aspects.

Figure 3:
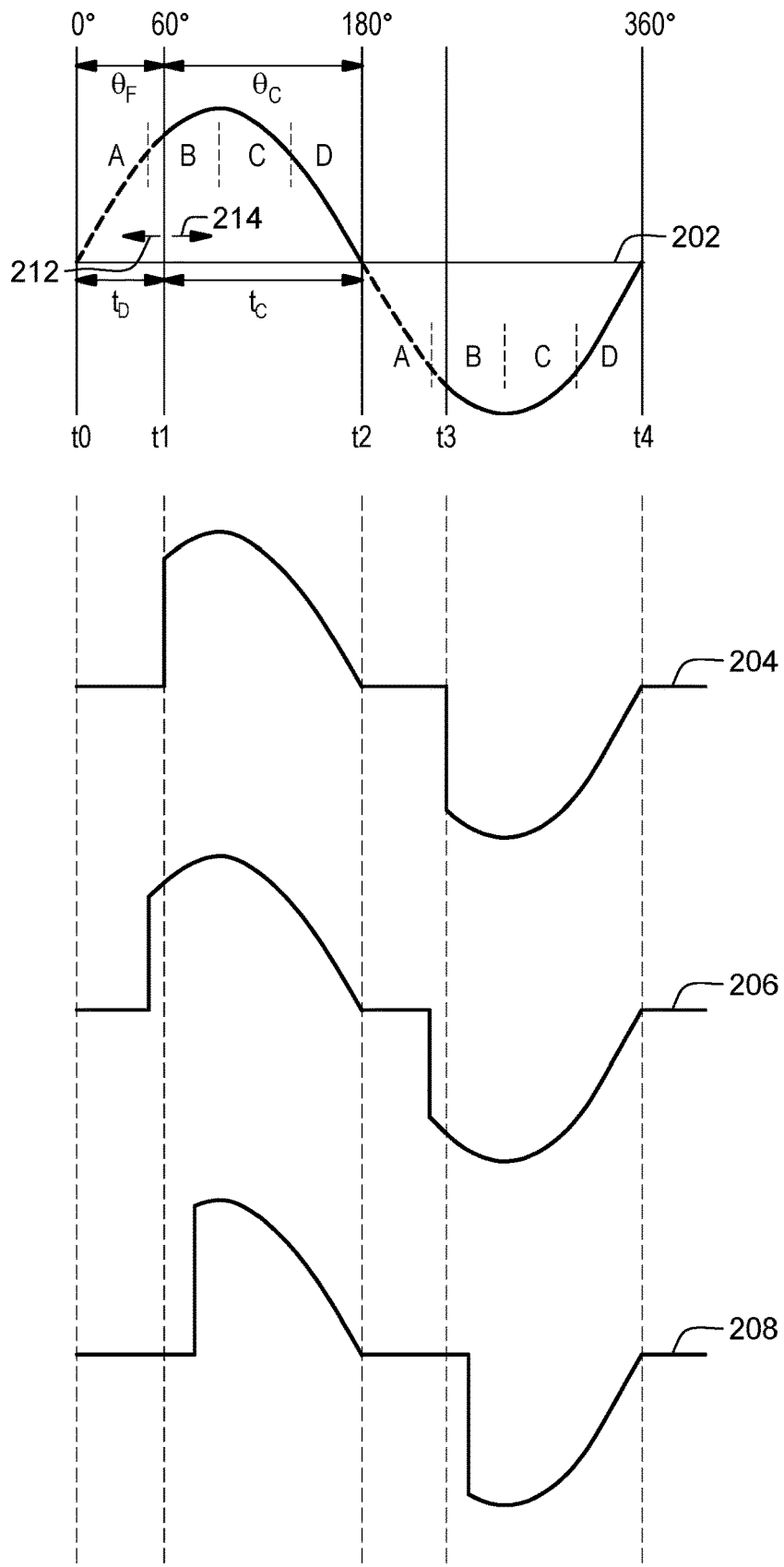
FIG. 3 is a timing diagram illustrating dimmer load control.

FIG. 3 is a timing diagram illustrating dimmer load control, and in particular forward phase control. A phase-controlled input line voltage is depicted by timeline 202. As noted previously, each input line voltage cycle of an AC power source (e.g. 110) can have a positive half-cycle beginning at a first zero-crossing time at time $t_0$ and ending at a midpoint (positive to negative) zero-crossing time $t_2$. The input line voltage cycle then has a negative half-cycle beginning at time $t_2$ and ending at another zero-crossing at time $t_4$. For common 60 Hz electrical power the entire line cycle from $t_0$ to $t_4$ lasts 1/60th of a second, thus a half-cycle lasts $1/120^{th}$ of a second.

During a delay period, $t_D$, from a zero-crossing, switch (e.g. 208) can remain OFF (unlatched). Then at time $t_1$, the switch can be turned ON (latched) resulting in the input line voltage being delivered to load with a return path of current to the neutral line. Timeline 204 illustrates voltage being delivered to the load under a phase control depicted by timeline 202. As noted, the switch can be self-commutating such that the switch stops conducting when current through the switch falls below the holding current level. When the current through the switch falls below its holding current level, the switch can turn OFF again so that voltage will no longer be applied to load. As depicted, the switch can cut OFF at time $t_2$ (about the zero-crossing time) and can be turned ON again (latched) at time $t_3$ after a delay period lasting from the zero-crossing at time $t_2$ until time $t_3$.

A dimmer circuit (e.g. 100, 200) can include (i.e. be configured with) a firing angle $\Theta_F$ and a conducting angle $\Theta_C$. A firing angle $\Theta_F$ of the dimmer circuit is the time ($t_D$) expressed in degrees per half-cycle that the switch is OFF so that power is not delivered to a load. A conducting angle $\Theta_C$ of the dimmer circuit is the time ($t_C$) expressed in degrees that the switch is ON so that power is delivered to the load. The firing angle and conduction angle in this context may correspond to a conduction start angle (angle, of the half-phase, at which the switching circuit is switch to the ON state to conduct the supply of power to the lighting load) and a conduction end angle (angle, of the half-phase, at which the switching circuit is switch to the OFF state to cease conducting the supply of power to the lighting load), used herein.

When an operator adjusts a dimming level of the dimmer circuit using a user interface/actuators, a firing angle $\Theta_F$ and conducting angle $\Theta_C$ of dimmer circuit can change. A dimmer circuit can have a non-conducting phase which can be active for the time $t_D$ prior to an initial firing of the switch to latch the switch during a half-cycle. The dimmer circuit can have a conducting phase that can be active for the time $t_C$ after an initial firing of the switch during the half-cycle. For slight dimming applications (i.e. high brightness), the dimmer circuit can cut OFF delivery of the input line voltage to the load for only small portions of a cycle—portions extending relatively short durations of time from a zero-crossing. For increased dimming (lower brightness), the dimmer circuit can cut OFF delivery of the line voltage to a load for longer times from a zero-crossing. In an example in which maximum brightness is desired, the controller can fire the switch circuit immediately when the controller receives the indication that a zero-crossing has occurred, so that the switch can be latched for the longest possible period of time before the power phase again transitions to a next half-cycle. In contrast, a longer delay in firing the switch after a zero-crossing will maintain the switch in an ON state for a lesser duration of time during the half-cycle before the next transition, and will result in less current draw and, in the case of a light source, a dimmer light. A control of the dimmer circuit to increase brightness as depicted by timeline 206 reduces a firing angle $\Theta_F$ and increases a conducting angle $\Theta_C$ as depicted by arrow 212. A control of the dimmer circuit to decrease brightness as depicted by timeline 208 increases a firing angle $\Theta_F$ (as depicted by arrow 214) of the dimmer circuit and decreases a conducting angle $\Theta_C$ (also as depicted by arrow 214). Timeline 204 indicates a load voltage provided by a dimmer circuit operating in accordance with the phase control as depicted in timeline 202. Timeline 206 indicates a load voltage provided by a dimmer circuit operating to provide increased light source brightness relative to that indicated by the load voltage depicted by timeline 204. Timeline 208 indicates a load voltage provided by a dimmer circuit operating to provide decreased light source brightness relative to a brightness that is indicated by the load voltage depicted by timeline 204.

In accordance with an aspect described herein, control circuitry of a two-wire dimmer has added monitoring for output or input) voltage of the dimmer's power supply. When the dimmer is being adjusted toward some (potentially as yet unknown) maximum brightness level, the control circuitry monitors the power supply voltage level as the conduction angle increases. If the power supply voltage level falls below an acceptable level, the dimmer stops increasing its conduction angle, i.e. the conduction period from a start time to an end time, which is the equivalent of the total angle through which the dimmer conducts the power to the load in a half-phase. This prevents the dimmer electronics from collapse. For bigger loads (in terms of power consumption), the power that the dimmer can harvest for its own operation is greater than for smaller loads, and therefore the dimmer may be adjusted to a higher conduction angle (start conduction angle to end conduction angle, therefore a brighter maximum brightness level) than for smaller loads.

Figure 4A:
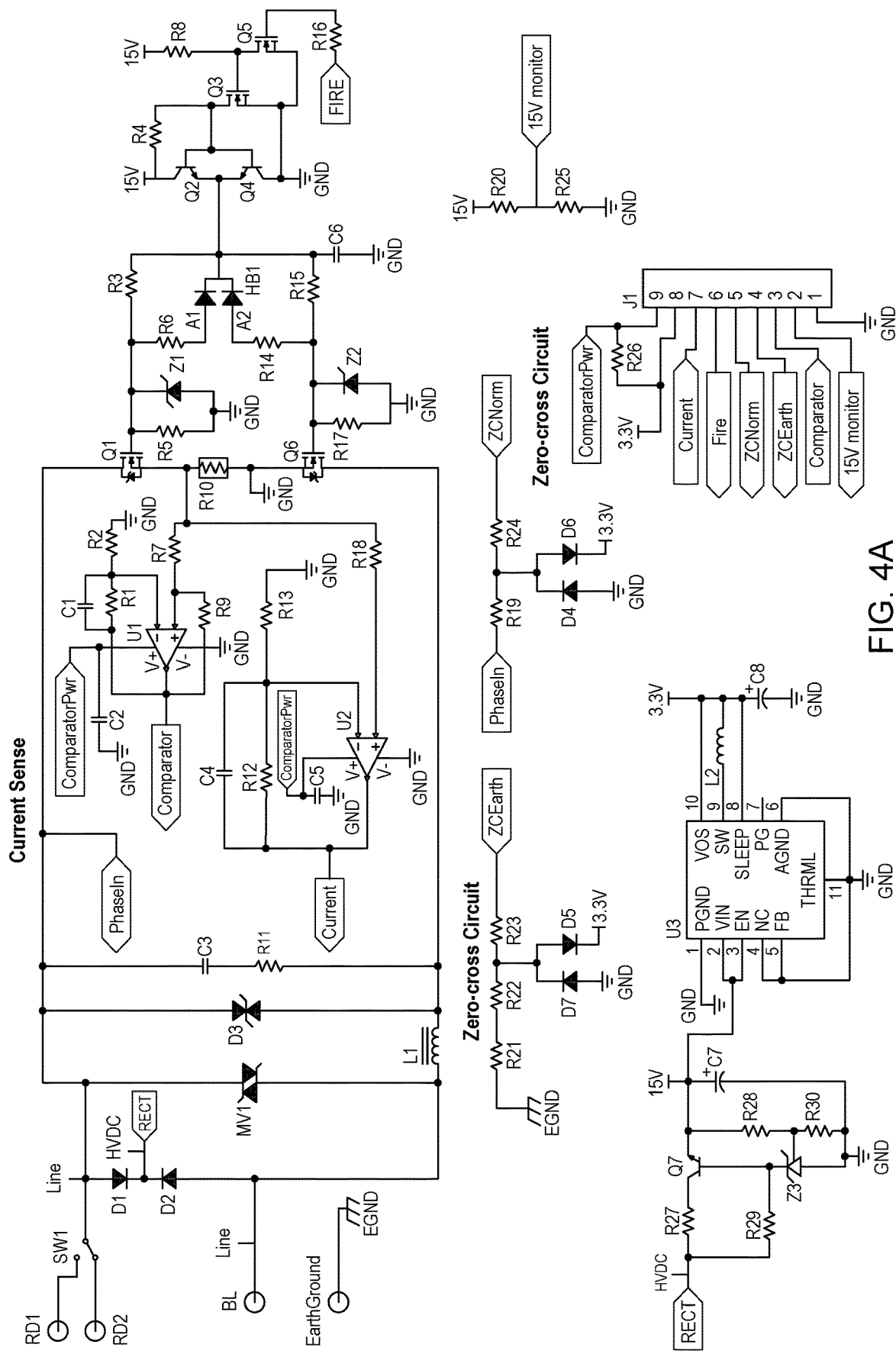
FIGS. 4A & 4B collectively illustrate a schematic diagram of an example dimmer in accordance with aspects described herein.
Figure 4B:
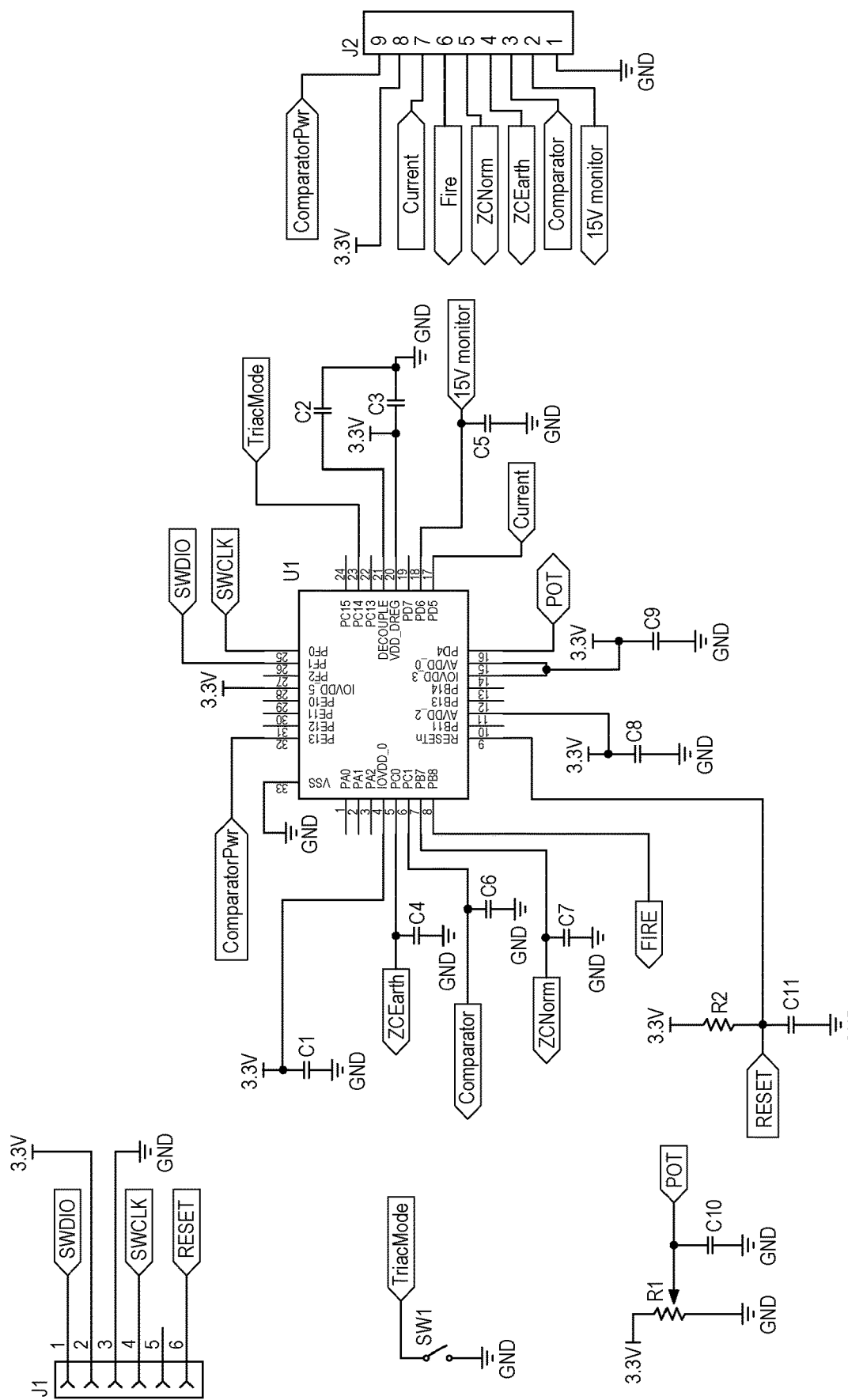

FIGS. 4A & 4B collectively illustrate a schematic diagram of an example dimmer in accordance with aspects described herein. Shown in two FIGS. 4A and 4B, the circuitry depicted therein could be implemented on two (or more) physical circuit boards, or modified for implementation on a single board, if desired. In this example, two physical boards are used and the J1 and J2 connectors on FIGS. 4A and 4B, respectively, represent a connection between the two boards.

Referring initially for FIG. 4A, diodes D1 and D2, and internal diodes inside MOSFET Q1 and MOSFET Q6 create a full wave rectifier bridge for the dimmer power supply. The rectified voltage is provided to the power supply including transistor Q7, voltage reference Zener diode Z3 with output voltage set by divider composed by resistors R28/R30, and R27/R29, and capacitor C7, providing a gate control voltage. In the examples of FIGS. 4A-5B, this gate control voltage is 15V, but this is by way of example only, and not limitation. The gate control voltage could be any desired voltage. The gate control voltage is for controlling MOSFETS Q1 and Q6, which are used in controlling power to the load.

The gate control voltage (e.g. 15V in this example) is provided to voltage regulator U3, a DC/DC converter in this example. Inductor L2 and capacitor C8 provide a DC/DC converter for 3.3V supply power used to power the microcontroller.

Metal-oxide varistor (MOV) MV1, transient voltage suppression (TVS) diode D3, capacitor C3, and resistor R11 form protection circuitry for the power supply and MOSFETs Q1 and Q6. Mechanical switch SW1 is a switch to turn the dimmer on and off. Inductor L1 reduces rise time in cases of forward dimming.

Two zero-cross circuits are provided in this example. Which of these is used for zero-crossing detection may depend on whether ground reference is available. Resistors R21, R22, and R23, and diodes D7 and D5 form a zero-crossing circuit using earth ground (EGND) as a reference. Resistors R19 and R24, and diodes D4 and D6 form another zero-crossing circuit using phase-in.

MOSFETS Q5, Q3, Q2, and Q4, resistors R16, R8, R4, R3, R15, R6, R14, R5, and R17, half-bridge HB1, and Zener diodes Z1 and Z2 compose MOSFET driving circuitry (gate control) using the FIRE output from the microcontroller U1 (FIG. 4B).

In the Current Sense portion of FIG. 4A, resistor R10 functions as a current shunt for measuring current through the load. Operation amplifier U2, resistors R18, R13, and R12, and capacitors C4 and C5 are components of shunt amplifier which output is to the input of an analog-digital converter implemented in the microcontroller (U1, FIG. 4B).

Amplifier U1, resistors R7, R1 and R2, and capacitors C1 and C2 monitor for overcurrent MOSFET protection. The output of amplifier U1 is connected to the microcontroller (U1, FIG. 4B) for fast shutdown in case of an overload. In an alternative, a direct connection may be made through resistors R7 and R9 to the comparator built inside of the microcontroller U1.

Amplifiers U1 and U2 can be optionally powered through a microcontroller pin (e.g. ComparatorPWr), for instance to operate only at startup, as a power saving feature. In this case, jumper resistor R26 (bridging the ComparatorPwr and 3.3V lines on pins 9 and 8 of J1) may be omitted.

Resistors R20 and R25 form a divider to limit potentiometer (POT, FIG. 4B) maximum power to 3.3V. R25 can be optional and used to reduce tolerance in potentiometer voltage in case the potentiometer has large tolerance compared to the regular resistors.

Referring now to FIG. 4B, U1 is the microcontroller, and capacitors C1, C2, C3, C8, and C9 are components of the microcontroller's power supply chain. Resistor R2 and capacitor C11 form a reset circuit, and capacitors C4, C5, C6 and C7 are filters for analog signals ZCEarth, 15V monitor, Comparator, and ZCNorm. R1 is a slide potentiometer with filtering capacitor C10. SW1 is a mode switch to select a mode of operation of the dimmer, e.g. TriacMode in this example. In a particular embodiment, SW1 can switch between a forward dimming mode and an auto mode (in which the dimmer automatically selects the mode). Additionally or alternatively, SW1 may be used to set MIN/MAX firing and/or conduction angles.

The supply of power in the dimmer has two stages. The first stage produces voltage V1 for MOSFET control—and is within some range of, e.g. 15V or other voltage to control the MOSFETs efficiently. The second voltage V2 produces power for proper operation of the microcontroller U1 (FIG. 4B), for instance 3.3V as in this example, or 5V as another example. The voltage divider formed by resistors R20, R25 and R1 (FIG. 4A) is connected to the 15V input of microcontroller U1. When the user adjusts the dimming adjustment circuit (e.g. raises the slide potentiometer R1) the dimmer increases the conduction angle to raise brightness and monitors the voltage V1 from the voltage divider. In an example, the microcontroller detects the adjustment to increase the conduction angle of the dimmer, which corresponds to a conduction time of the switching circuit. Based on detecting the adjustment, the microcontroller adjusts parameters of the dimming operation, i.e. the selective control of the switching circuit, for instance to increase the conduction angle as requested by way of the user adjustment. Concurrent with this adjusting, the microcontroller monitors a voltage of the dimmer power supply. The monitoring could be an input voltage or output voltage of the dimmer power supply, and in a specific embodiment is the output of the dimmer power supply, which is (at least initially) substantially a first voltage, for instance 15V. This first voltage can be a calibrated voltage, for instance calibrated at dimmer power-up before the dimmer starts controlling the light output or when the dimmer begins controlling output at a relatively low level when the conduction angle is sufficiently small that the power supply has sufficient power.

Based on this monitoring by the microcontroller, the microcontroller can detect when the monitored voltage V1 drops, for instance from substantially the first voltage (about 15V) to a second, lower voltage. Based on detecting this drop, the microcontroller is configured to automatically stop increasing the conduction angle regardless of whether the user continues to attempt to raise the brightness. In some examples, the microcontroller after detecting the voltage drop will decrease the conduction angle to a slightly lesser angle corresponding to a lower brightness, for instance in order to restore voltage V1 to an acceptable level (substantially the first voltage, e.g. about 15V in this example). In this manner, a maximum conduction angle for the dimmer is established using (i) the conduction angle of the dimmer when the monitored voltage is detected to have fallen to the second voltage and (ii) some offset corresponding to the decrease needed or desired to restore V1 to an acceptable level. In an example, this maximum conduction angle is set at the conduction angle of the dimmer where the voltage V1 is detected to have fallen to the second voltage minus the offset. Practically speaking, the offset may be small enough that the difference in brightness is not visible for users. With the maximum conduction angle established, operation of the dimmer is controlled using the established maximum conduction angle. The dimmer is configured not to surpass this maximum conduction angle in its normal operation regardless of whether the user attempts to increase brightness.

Any of various approaches can be taken for the offset amount. It could be a predetermined number of angular degrees. Alternatively, it could be a fixed percentage (for instance 3%) of the conduction angle of the dimmer when the voltage V1 is detected to have fallen to the second voltage. Other options are possible.

As an alternative, the monitoring could monitor a rate of change in the voltage V1 as the conduction angle is increased and cease raising the conduction angle when the rate of change reaches/surpasses a threshold. The maximum conduction angle could then be established as the conduction angle where the rate of change exceeds the threshold, minus the offset.

The second voltage can be a predetermined voltage that is lower than the first voltage, for instance could be a fixed voltage value less than the first voltage, or a variable voltage that is set as a function of the first voltage, for instance 5% of the first voltage.

For TRIAC-based dimmers, or more broadly forward phase dimming applications, the microcontroller can establish the maximum conduction angle (the total angle through which the dimmer conducts the power to the load) by increasing, by an amount of the offset, the time when the switching circuit turns on. In other words, the dimmer could increase the angle at which the switching circuit is configured to be selectively controlled to switch to the ON state (the firing angle/conduction start angle), to delay the firing longer after the zero-crossing.

For transistor-based dimmers, or more broadly reverse dimming applications, the microcontroller can establish the maximum conduction angle by decreasing the time when the switching circuit turns off by an amount of the offset, that is by decreasing the angle at which the switching circuit is configured to be selectively controlled to switch to the OFF state (the conduction end angle).

Figure 5A:
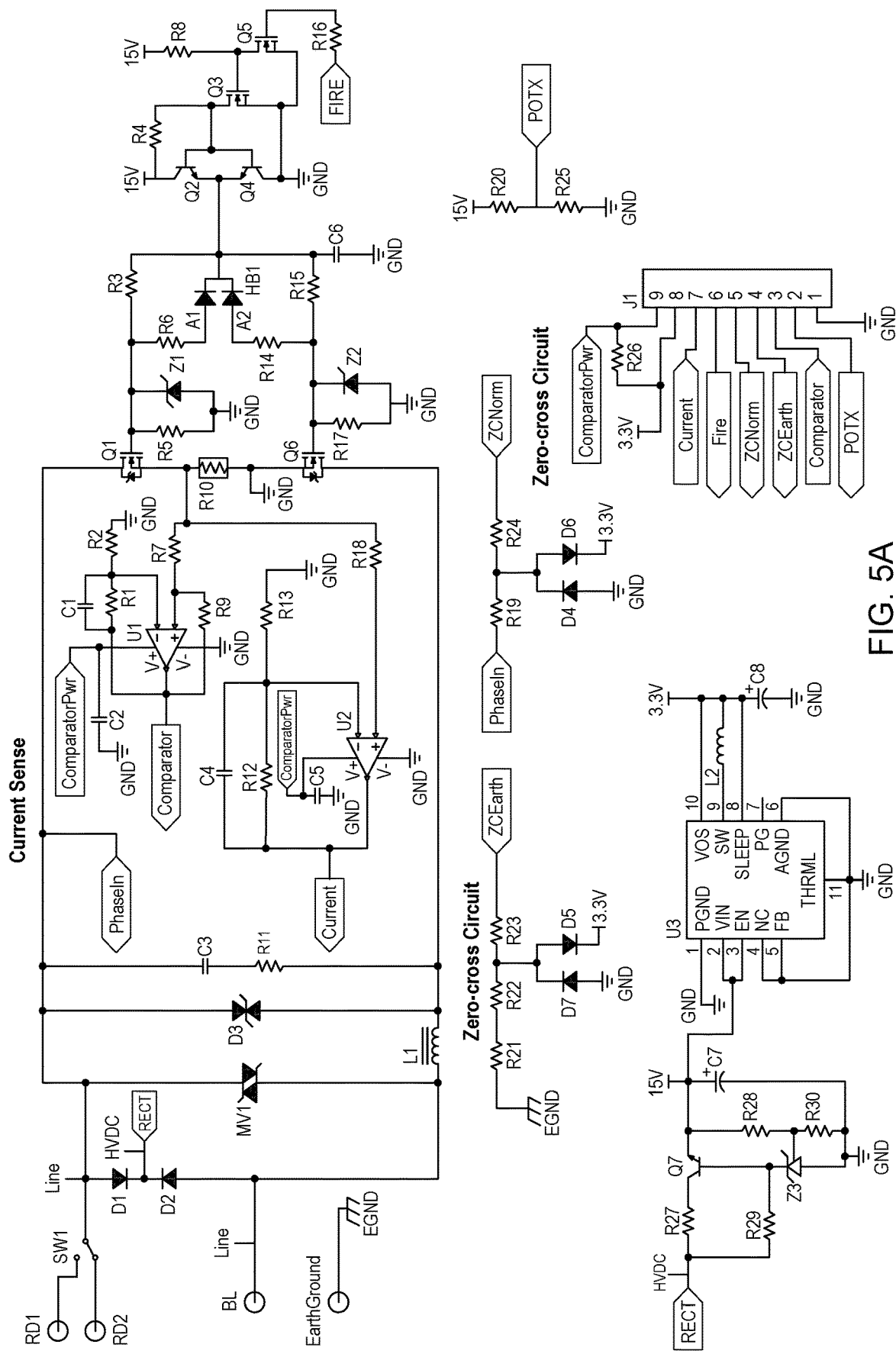
FIGS. 5A & 5B collectively illustrate a schematic diagram of another example dimmer in accordance with aspects described herein.
Figure 5B:
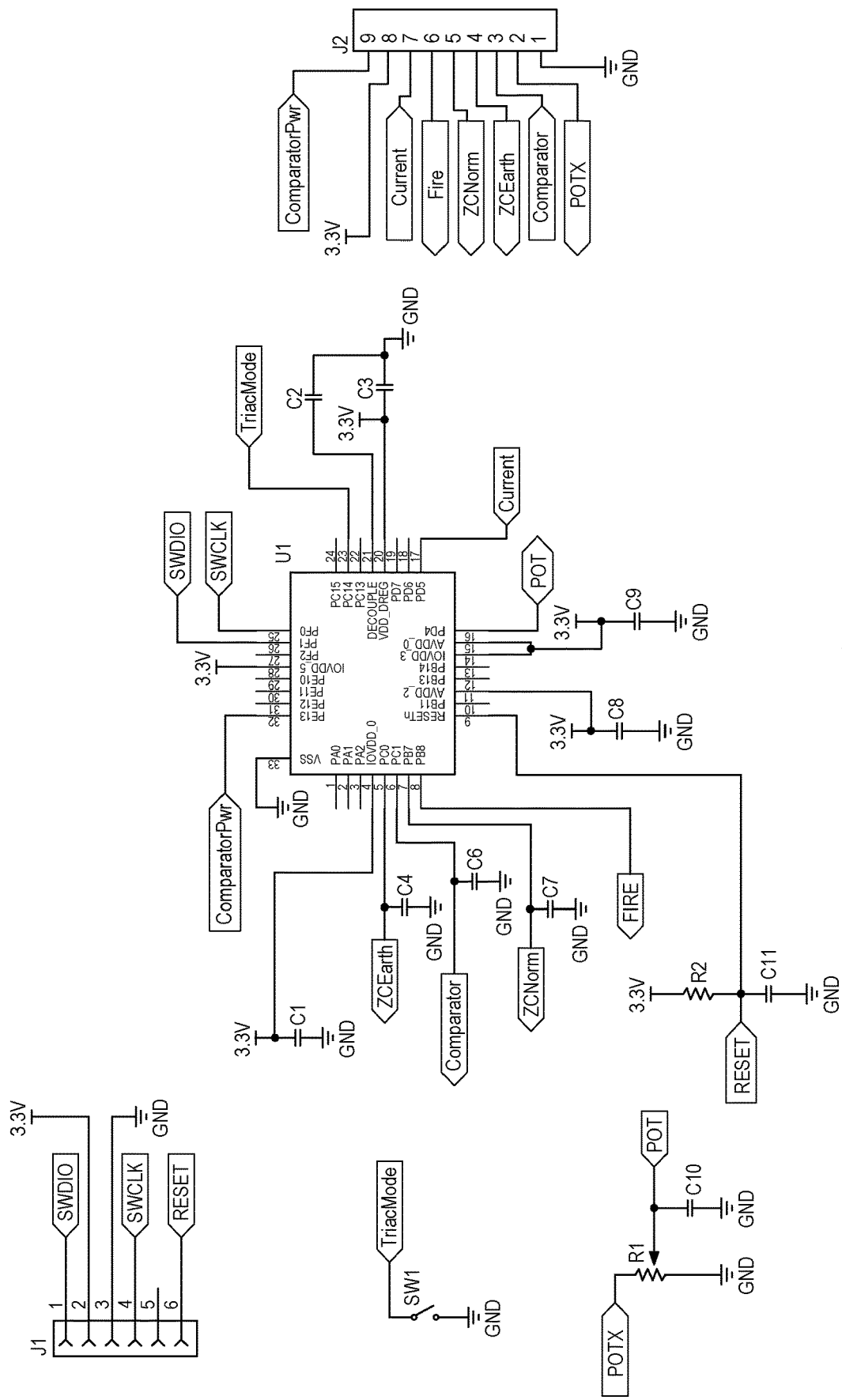

FIGS. 5A & 5B collectively illustrate a schematic diagram of another example dimmer in accordance with aspects described herein. The example of FIGS. 5A and 5B presents an alternative approach for controlling brightness of a dimmer, and in particular preventing starvation of the dimmer power supply on account of too high a brightness setting. Several of the components and functions of the schematic diagram of FIGS. 4A and 4B described above are the same as in the schematic diagram of FIGS. 5A and 5B, and therefore a description thereof is omitted. Differences between the schematic of FIGS. 4A and 4B in comparison to the schematic of FIGS. 5A and 5B are now described as follows.

Referring to FIG. 5A, resistors R20 and R25 form a divider for POTX signal through connector J1 to the circuit components of FIG. 5B. Specifically, referring to FIG. 5B, the POTX signal is fed to the potentiometer R1 that produces the POT signal input to the microcontroller U1 at input PD4 pin 16. The 15V monitor signal of FIG. 4A leading through connector J1 to the microcontroller (and corresponding capacitor C5 of FIG. 4B) are omitted in this example schematic.

In the example of FIGS. 4A and 4B, the microcontroller monitors the power supply voltage via the 15V monitor line and executes an algorithm to establish a maximum conduction angle when the monitored power voltage drops. In contrast, the microcontroller in the example of FIGS. 5A and 5B does not directly monitor the power supply voltage. The microcontroller also need not execute the aforementioned algorithm to monitor for such a drop. Instead, in FIG. 5B, the dimming level adjustment circuit, e.g. the potentiometer R1, is electrically coupled between the dimmer power supply voltage of about 15V and the controller of the dimmer. The dimming level adjustment circuit provides a dimming level signal to the controller, which indicates a desired dimming level for the dimmer. The potentiometer feeds from the power supply voltage. When the power supply voltage starts to go down based on the user increasing brightness to the point where the power supply is starved of power, the voltage on the potentiometer will automatically also goes down. The microcontroller observes that voltage (POT signal) to dictate the conduction angle. A reduction in the voltage on the POT line (by way of a drop on the POTX line) operates to self-limit the conduction angle the microcontroller uses for its dimming operation. In this example, just one analog-to-digital channel is used, which is the POT. As the user operates the potentiometer to increases brightness, this raises the voltage on POT to a higher level. Eventually the power supply voltage starts to drop when the power supply becomes starved. Because that power supply voltage is fed to the potentiometer, the voltage read from the potentiometer also decreases. The microcontroller may not be aware whether the drop is due to the user adjusting the potentiometer or, in this example, a drop of the power supply voltage, but nevertheless reduces the conduction angle based on the decreasing POT voltage.

In accordance with these aspects, a maximum value of the dimming level signal, and therefore a maximum configurable desired dimming level for the dimmer, is based on the dimmer power supply voltage, and the controller is configured to perform receiving the dimming level signal (e.g. POT signal informing a setpoint for brightness) from the dimming level adjustment circuit and setting a dimming level for the dimmer based on the received dimming level signal.

With respect to FIGS. 4A and 4B, there are microcontroller connections for both the 15V signal and the POT signal, and when the voltage drops sufficiently, the microcontroller can ignore what the POT signal dictates and proceed with lowering the conduction angle on basis that the ~15V power supply voltage dropped. In contrast, the example of FIGS. 5A and 5B monitors the POT to calculate the conduction angle and when brightness is increased to such an extent that the ~15V power supply voltage drops, this causes POT signal to go down automatically, thereby automatically conveying to the microcontroller by way of that signal that the conduction angle setting is to change, for instance to increase conduction start time and/or decrease conduction end time. The embodiment of FIGS. 5A and 5B works to control maximum brightness automatically without a direct monitor of the power supply voltage.

In an example, sensed voltages on the POT line can correspond to values in a table or other structure, the values being, for instance, specific firing angles or conduction end angles appropriate for respective sensed voltages so as to not starve the dimmer's power supply. As a user increases the brightness, voltage on the POT goes to some point at which the power supply becomes starved and the power supply power drops from ~15V to something lower with any further increase in brightness. The voltage on the POT line stops increasing and drops, providing automatic control without/absent the microcontroller directly monitoring the power supply voltage. Thus, at some point in the dimming range as the user increases brightness, the POT voltage ceases increasing and will drop. The microcontroller can set the brightness based on that. It may be possible for the microcontroller to ascertain that the voltage drop is truly the result of an attempted over-increase rather than user-provided decrease by way of potentiometer adjustment. For instance, if the controller logs the conduction angle at which POT voltage drops and observes that a drop occurs every time a particular conduction angle is reached, this suggests that that is a maximum for proper operation of the dimmer, rather than just a point at which the user has repeatedly decreased brightness. A maximum brightness can be set at the corresponding conduction angle. As an alternative, the maximum could be set at the conduction angle minus some offset, such as is described above. Additionally or alternatively, a table as described above is checked to determine appropriate start and/or end angle(s) given the sensed POT voltage.

It is noted that it is not necessary for the microcontroller to monitor of the power supply voltage directly in this example, as the maximum setting is achieved automatically by way of configuration described and depicted with reference to FIGS. 5A and 5B. Based on adjustment of the dimming level adjustment circuit to increase the dimming level signal (POT) being provided to the controller, the maximum value of the dimming level signal may be reached and limited inherently by the dimmer power supply voltage, since that voltage level is based on how much power is being delivered to the load as opposed to being available for powering the dimmer. At some point, based on further adjustment to the dimming level adjustment circuit to increase the dimming level signal after the maximum value of the dimming level signal has been reached, the dimming level signal remains at the maximum value of the dimming level signal (or drops). This value (optionally minus an offset) could be stored/set by the microcontroller such that the controller remembers the corresponding maximum dimming level for the dimmer, and this could be saved even after the user subsequently adjusts the potentiometer downward to decrease brightness. In other words, initially, before a maximum value of the dimming level signal (POT signal) is encountered and set, and as the dimming level signal continues to increase based on user adjustment, the ascertained 'maximum' value of the signal continues to be adjusted upward based on the setpoint of the potentiometer. At some point the true maximum value of that signal is reached, where further upward adjustment of the potentiometer does not cause a corresponding increase in the POT signal. A true maximum value of the dimming level signal can be ascertained for that point, and this level stored (optionally minus an offset) even after the user decreases the dimming level signal to something lower. In the case where the user dims the load, the dimmer delivers the user's desired dimming level but retains the stored maximum for whatever purpose the dimmer might use this maximum, including placing a ceiling on subsequent brightness increases.

In accordance with a further aspect described herein, a power harvesting approach is presented for use in reverse dimming situations, for instance when transistors are used to switch power to the load. Reverse phase dimming is commonly employed in controlling the supply of power to LED loads. This approach can be used in conjunction with other aspects describes herein, for instance to implement the 'offset' aspect above where, after ascertaining the point at which the power supply becomes starved due to increasing brightness, the dimmer is to decrease the conduction period.

As explained above, conventional reverse phase dimming employs a conduction start time for a half-cycle at, or as near as possible to, the zero-crossing into that half-cycle, and employs a conduction end time set at some angle less than 180 degrees. Adjusting the conduction period to increase brightness in a conventional reverse phase approach increases or decreases the conduction end time to adjust the overall conduction period for the half-phase.

In accordance with a power harvesting approach described herein, when increasing brightness of the load, the conduction end angle is increased to effectuate the increased brightness, and, in addition, the firing angle is increased from an initial angle of substantially the zero-crossing (~0 degrees) to some increased angle. Increasing the firing angle (conduction start angle/time) delays firing by some amount after the detected zero-crossing. Increasing both the conduction end angle and conduction start angle results in a net increase in the power being delivered to the load. Additionally, the relatively small delay imparted to the firing of the switch increases the power available for the device/dimmer power supply, as the portion of power at the beginning of the wave from the zero-crossing to the adjusted firing angle provides power to the dimmer's power supply. Since the amount of energy at the beginning of the sine wave of the power line is relatively small compared to the middle portion of the wave, the increase of the firing angle from substantially 0 degrees to a larger angle still within the beginning of the half-phase has very little or no noticeable effect on the light output of the load, meaning it may be imperceptible to users.

Thus, based on an adjustment to increase brightness in a reverse phase dimming scenario, where the conduction end angle is increased to provide more power to the load, the firing of the switch is delayed from the start of the half-cycle (zero-crossing) to a later point, giving additional time for the dimmer power supply to charge.

The delay could be a fixed delay. For instance, the amount of the increase in the conduction start angle from the first conduction start angle (substantially the zero-crossing) to a second conduction start angle is a fixed number of angular degrees corresponding to a fixed delay time. Additionally or alternatively, the amount of delay, and whether or not the delay is imparted, could be a function of the conduction end angle, where larger conduction end angles result in an increased delay in the firing. The firing delay could be a continuous increase or a stepped increase. In an example of a stepped increase, the conduction start angle could be set at the detected zero-crossing as long as the conduction end angle is at or lower than some first angle (for instance 90 degrees), set at a first delay (e.g. 5 degrees) when the conduction end angle is between the first angle and a second angle (e.g. 90 degrees to 120 degrees) and set at a second delay (e.g. 8 degrees) when the conduction end angle is between the second angle and a third angle (e.g. 120 degrees to 160 degrees).

In this manner, an amount of the increase in the conduction start angle from a first conduction start angle to a second conduction start angle may be based on the second conduction end angle. The amount of the increase in the conduction start angle from the first to the second can be a mathematical function of at least the second conduction end angle (either before or after the increase to effectuate the brightness increase), such that different second conduction end angles correspond to different amounts of the increase in the conduction start angle.

Additionally or alternatively, the amount of the increase in the conduction start angle from the first conduction start angle to the second conduction start angle can be based on an amount of the increase in the conduction end angle, i.e. from the first conduction end angle to the second conduction end angle. In this example, the increase in the conduction start angle could be a function (e.g. some fixed percentage) of that increase in the conduction end angle.

In some aspects, the amount of the increase in the conduction start angle from the first conduction start angle to the second conduction start angle is capped at a predefined maximum, i.e. a maximum delay, for instance between 0.9 and 1.21 milliseconds, and in some embodiments between 1 and 1.2 milliseconds, inclusive.

Aspects of the power harvesting approach described herein could be employed in conjunction with a load type detection technique also described herein. For instance, the dimmer could automatically configure itself for the microcontroller to perform the power harvesting approach based on detecting that the lighting load is an LED lamp.

Figure 6A:
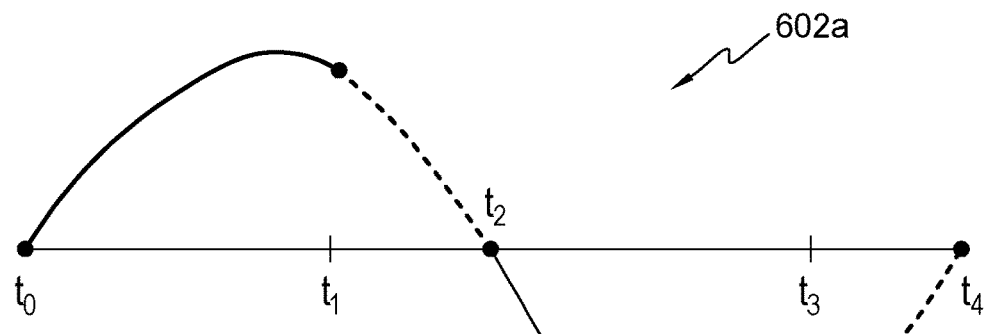
FIGS. 6A-6C depict example timing diagrams showing adjustment of conduction angles during a single cycle of input line power, in accordance with aspects described herein.
Figure 6B:
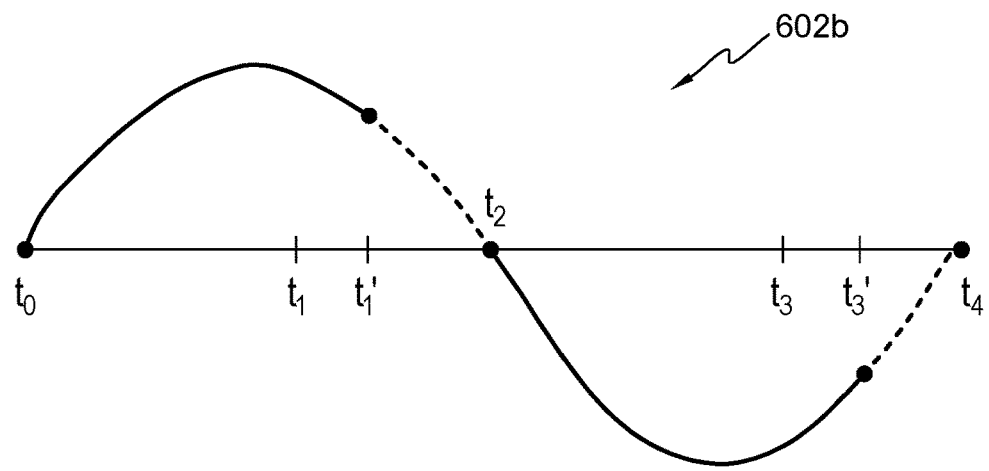
Figure 6C:
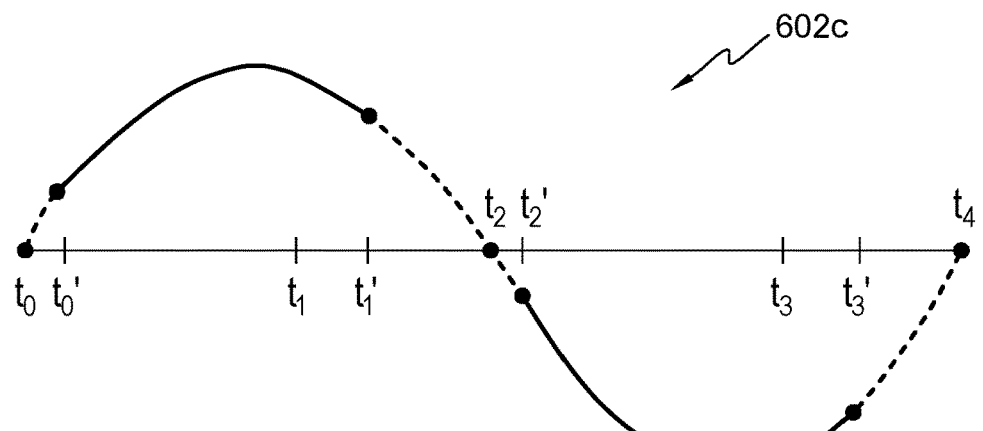

To illustrate aspects of the power harvesting approach, refer to FIGS. 6A-6C, depicting example timing diagrams showing adjustment of conduction angles during a single cycle of input line power, in accordance with aspects described herein.

Timing diagram 602a of FIG. 6A shows a full phase (two half-phases) of a power wave, the full phase extending from the zero-crossing at time t0 (representing the very beginning of the phase) though the positive half-phase ending at the zero-crossing at time t2, and through the negative half-phase ending at time t4. The solid portion of the wave represents a period of conduction when the switching circuit is controlled to be in the ON state and the dashed portion of the wave represents a period of non-conduction when the switching circuit is controlled to be in the OFF state. In FIG. 6A, the conduction period of the positive half-phase extends from time t0 to time t1. The conduction start angle is at the zero-crossing and the conduction end angle is at the angle corresponding to time t1. From time t1 to time t2, the switch is not conducing and the power is not supplied to the load. It is during this time that the power supply of the dimmer may be charging. Similarly, the conduction period of the negative half-phase extends from time t2, the zero-crossing, to time t3.

FIG. 6B presents timing diagram 602b to illustrate the effect of increasing brightness in a reverse phase dimming scenario. Here, the conduction period in the positive half-cycle now extends from time t0 to time t1' on account of an increase in the conduction end angle. Similarly, the conduction period in the negative half-cycle has been extended to time t3'. The increase in power delivered to the load is the power delivered between times t1 and t1' and between times t3 and t3'.

FIG. 6C presents timing diagram 602c illustrating aspects of the power harvesting approach described herein. A firing delay has been imparted at the beginning of the conduction period in both half-phases. Firing time (conduction start time) of the positive half-phase is increased from time t0 to time t0'. During this time, the relatively little power that would otherwise have been provided to the load if the conduction start time were not delayed can be harvested to charge the dimmer power supply. Similarly, the conduction start time of the negative half-phase is increased from time t2 to time t2' enabling the power corresponding to that timeframe to be harvested to charge the dimmer power supply.

In some embodiments, the microcontroller follows the power harvesting approach to set together the conduction start and end times/angles, proceeding from the timing control shown in FIG. 6A to that shown in FIG. 6C. In other embodiments, the microcontroller implements the power harvesting approach in a sequence by first increasing brightness as shown in FIG. 6B and then applying the firing delay to decrease (relatively slightly) brightness as shown in FIG. 6C. The speed at which this sequence can be applied under renders the decrease in brightness imperceptible to human users.

It is noted that a net brightness increase will result when the increase in power to the load resulting from the increase in the conduction end time/angle is greater than the decrease in power to the load resulting from the increase in the conduction start time/angle. It is further noted, however, that this does not necessarily mean that the increase in the conduction end time/angle is greater than the increase in the conduction start time/angle, since the amount of power delivered in the middle portion of a half-phase during a length of time is greater than the amount of power delivered at the beginning and end of the half-phase for that length of time.

In accordance with aspects of the power harvesting approach, a controller selectively controls the dimmer switching circuit between the ON state and the OFF state to control dimming operation of the dimmer according to a conduction angle/period corresponding to a conduction time for the switching circuit to conduct the supply of power to the load during each half-phase of a plurality of half-phases of the supply of power. The conduction angle is defined by a conduction start angle and a conduction stop angle, the conduction start angle being an angle of the half-phase at which the switching circuit is switch to the ON state to conduct the supply of power to the lighting load, and the conduction end angle being an angle of the half-phase at which the switching circuit is switch to the OFF state to cease conducting the supply of power to the lighting load. Then, based on detecting an adjustment to increase the conduction angle, for instance a user raises a potentiometer actuator, the controller adjusts the selective control of the switching circuit. This adjustment to the selective control includes increasing the conduction end angle from a first conduction end angle to a second conduction end angle greater than the first conduction end angle. An angular adjustment corresponds to a time delay or adjustment, so the controller can operate using either or both units. The adjusting the control also increases the conduction start angle from a first conduction start angle to a second conduction end angle greater than the first conduction start angle. Increasing the conduction end angle and the conduction start angle results in a net increase in the conduction angle or period during the half-phase. Based on these adjustments, the controller controls operation of the dimmer, for instance according to the parameters just set.

Yet another aspect described herein provides approaches for load type detection. The preferred approach for a dimmer to use in dimming a load may depend on the particular type of the load. LED loads may preferably be controlled using reverse phase dimming, as this reduces current spikes that can be significantly bigger compared to root mean squared (RMS) of the current through the LED loads. Magnetic low voltage (MLV) loads may preferably be controlled using forward phase dimming to avoid large voltage spikes that can be damaging to the dimmer. Incandescent and halogen loads can generally be controlled using either reverse phase dimming or forward phase dimming.

Selection of the proper dimming mode for the dimmer to use is therefore important. Some dimmers provide the ability to select between forward phase dimming and reverse phase dimming modes. However, damage or malfunction could result if the device remains in the selected mode after the load is replaced by that of a different load type that is to operate under a different dimming mode. Consequently, there is a desire for automatic, fast, and non-intrusive detection of load type.

Proposed herein is a load type detection approach performed when the dimmer is powered/booted. When the lighting load is off, the dimmer, or at least the dimming function, is generally not running. When the light is turned on, this boots the dimer/dimming function. At that point, a load type detection approach as described herein is able to quickly detect the type of load and configure the proper dimming parameters based on that load type. Example parameters include those that control dimming operation of the dimmer, e.g. the dimming mode, and specifically forward phase dimming or reverse phase dimming.

When power MOSFETs are used for switching, the device commences operation by turning on the transistor(s) at the zero-crossing. This is done to prevent damage in case the two-wire dimmer device mis-wired; if current exceeds an allowable limit, the MOSFET(s) can be turned off immediately to prevent device damage. After a short time (for instance about 0.9-1 millisecond), the dimmer can turn off the transistor(s) and then, after a short delay (for instance about 100-200 microseconds), turn the transistor(s) on again for a short time (for instance about 100-200 microseconds).

Current through the load under this multi-pulse approach will differ depending on the load type. In case of an LED load, because the LED load's internal capacitor is not fully charged when the dimmer is turned on at a small conduction angle, turning on at a time other than at or very near the zero-crossing creates a spike. In the case of an incandescent or halogen bulb, as examples, the spike is significantly smaller and almost none. For example, with a 100-200 microsecond timing difference between the first and the second pulses (each pulse to turn ON the switching circuit for the duration of the pulse), the spike in current to the load resulting from the second pulse may be expected to be below about 125% (+/−3%) of the spike in current to the load resulting from the first pulse. For MLV loads, the spike from the second pulse can be even lower than the spike from the first pulse because of the inductive character of the load.

This difference in performance under the different load types (e.g. LED vs. other load types) can be leveraged to detect the type of load being used in a particular application of the dimmer. After the load type is automatically detected, the proper dimming approach (e.g. reverse phase vs. forward phase) may be selected. Reverse phase dimming can be selected for an LED load and forward phase dimming selected for other load types, as an example. The type of load may dictate other parameters under which the dimmer might operate.

Accordingly, a first control pulse is delivered to turn on the switching circuit at, or very near, the zero-crossing of a half-phase. The particular half-phase could be the first half-cycle that the dimmer recognizes after the dimmer is turned on because it is typically desired for the detection to occur as soon as possible. This may be initiated by a user switching the user-actuated switch to turn on the light.

The first control pulse is delivered for a configurable amount of time. Delivering the first pulse at the beginning of the half-phase may be desirable since a mis-wiring or short-circuit condition can be detected immediately, enabling the dimmer to be turned off to prevent damage. The dimmer detects a level of current provided to the lighting load during this first duration of time when the switching circuit is switched on during the first control pulse. Current to the load may be detected using, e.g., current shunt resistor R10 and operation amplifier U2 of FIGS. FIGS. 4A and 4B, which provide a measure of current to the microcontroller via CURRENT signal. A second control pulse, sequentially subsequent to the first control pulse, is applied for a configurable second duration of time and current is provided to the lighting light for that second duration of time. The dimmer detects a level of current provided to the lighting load during this second duration of time when the switching circuit is switched on as a result of applying the second control pulse. The detected levels of current can then be compared to ascertain the type of load.

Figure 7:
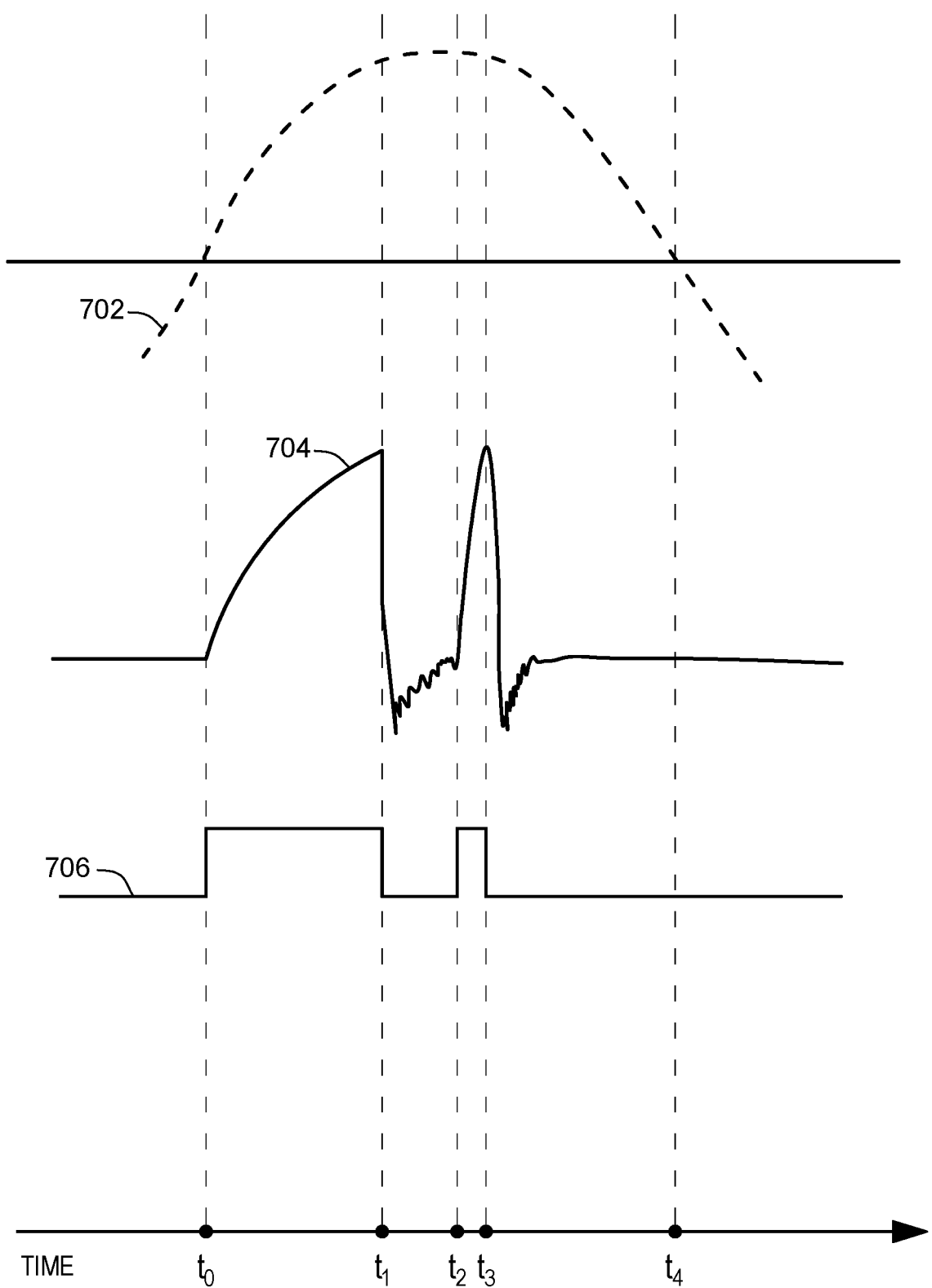
FIG. 7 depicts an example timing diagram showing power through a non-LED load using a multi-pulse technique for load type detection in accordance with aspects described herein.

To illustrate a difference between LED and other load types, refer initially to FIG. 7. FIG. 7 depicts an example timing diagram showing power through a non-LED load using the multi-pulse technique for load type detection, in accordance with aspects described herein. 702 plots a half-phase of line power available to the dimmer. The half-phase extends from time t0 to time t4 of the timeline at the bottom of FIG. 7. 706 is a square wave representing ON and OFF states of the control pulse to latch/unlatch the switching circuit between ON and OFF states. The dimmer's microcontroller can apply these pulses. Here, the two square peaks correspond to first and second control pulses. The second control pulse is observably much shorter in duration of time than the first control pulse. Applying the pulse latches the switch, thereby delivering power to the load. 704 represents detected current through the load. It is seen that the increase in current level detected during the first pulse is smooth and follows generally the power wave 702. The current is highest at the point when application of the first control pulse ceases at time t1. Current to the load abruptly decreases at that point. Second control pulse is applied from time t2 to time t3, during which the current through the load peaks at or near that highest current level detected during the first control pulse. For some non-LED loads, the maximum current levels detected during these pulses are expected to be with some range of each other, for instance within 25% of each other, when selected pulse timing and duration is followed.

Figure 8:
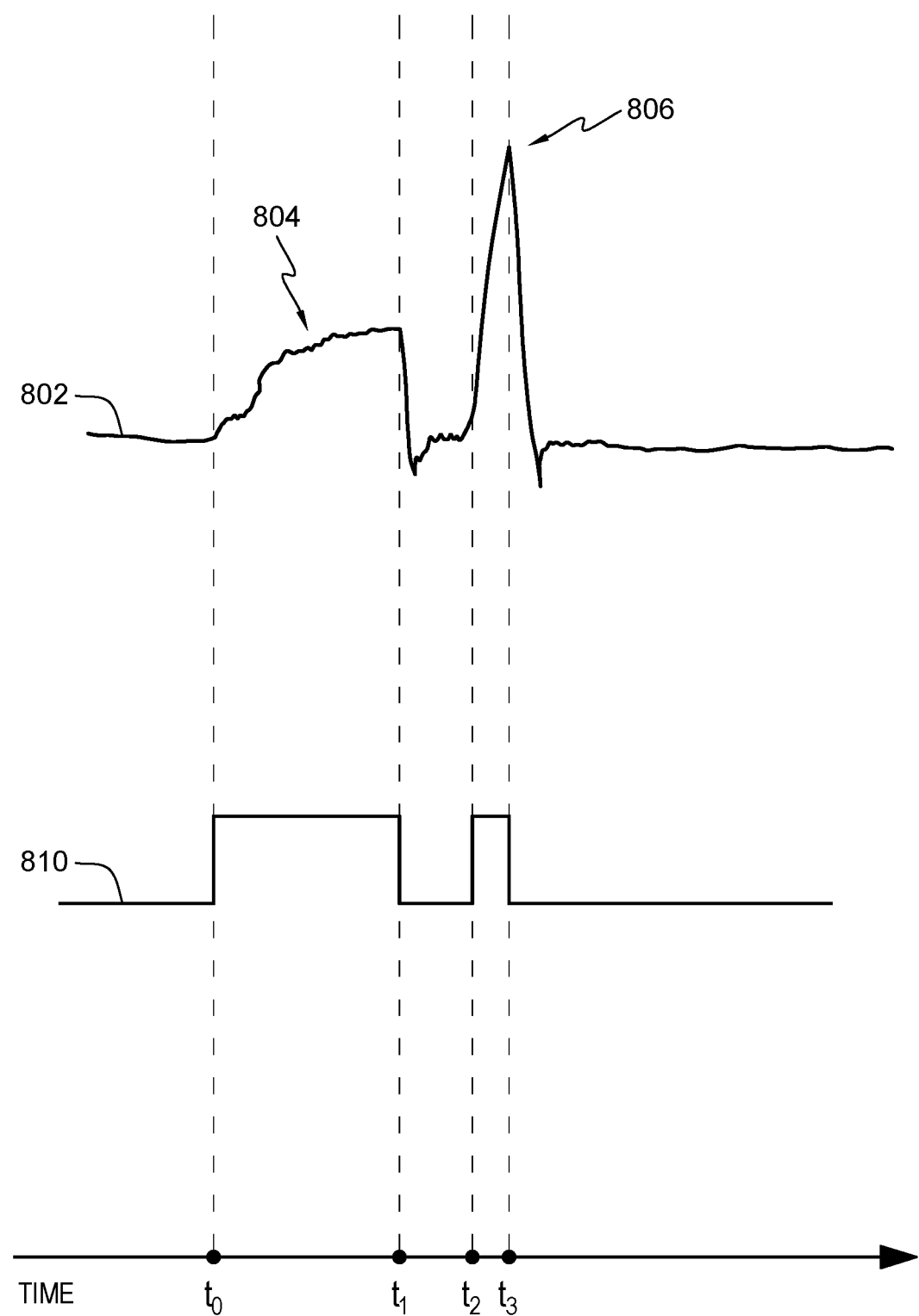
FIG. 8 depicts an example timing diagram showing power through an LED load using a multi-pulse technique for load type detection in accordance with aspects described herein.

FIG. 8 depicts an example timing diagram showing power through an LED load using a multi-pulse technique for load type detection in accordance with aspects described herein. 802 is a plot of power through the load over time. 810 is a square wave representing ON and OFF states of the control pulse to latch/unlatch the switching circuit between the ON and OFF states. At time t0, a first control pulse is applied for a first duration of time, for instance 1 millisecond, until time t1. Current fluctuates during this first duration of time but generally rises as indicated by 804, though not as smoothly or as in conformance with line voltage as the case of 704. Highest current level during this time is at time t1 when the pulse is removed and the switching circuit is opened. Current drops to fluctuate about 0 during time t1 to time t2. When the second pulse is applied at time t2, a noticeable spike in current (806) results, peaking at time t3. The second pulse ends at time t3 and current against falls to fluctuate about 0. This all occurs in one half-phase of line power. It is noted that the pulse timing and duration in FIGS. 7 and 8 has been exaggerated greatly for purposes of example. The figures are not drawn to scale. Example timing and duration for practical applications is presented elsewhere herein.

Multiple pulses (e.g. two or more) are used in a single half-cycle for load type detection in accordance with aspects described herein. The properties of current to the load are observed in order to ascertain a load type. Specifically, a process can be performed by a dimmer, for instance by a controller of the dimmer executing code. The process applies a first control pulse to the switching circuit to switch the switching circuit into the ON state from the OFF state to conduct the supply of power to the lighting load. The first control pulse can begin at a first starting time and extend for a first duration of time that ends at a first ending time. Additionally, the process applies a second control pulse to the switching circuit to switch the switching circuit into the ON state from the OFF state to conduct the supply of power to the lighting load. The second control pulse begins at a second starting time, after the first ending time, and extends for a second duration of time that ends at a second ending time. The process detects levels of current provided to the lighting load during the first duration of time as a result of applying the first control pulse and during the second duration of time as a result of applying the second control pulse, and compares a first current level (from applying the first control pulse) to a second current level (from applying the second control pulse). Since potentially many current levels within each of the first and second durations of time are being observed, there are different options for what is selected as the 'first current level' and the 'second current level'. In one example, it is the peak current to the load that was detected during the given duration of time. Alternatively, it could be average (weighted or otherwise) current through the load during the duration of time. Other examples are possible.

Based on the comparison, the process ascertains the load type of the load and selects, based on that ascertained load type, parameters to control dimming operation of the dimmer.

Comparing the first and second detected current levels can determine a percentage difference between the first current level and the second current level. If the difference is greater than some configurable threshold, the ascertaining can ascertain that the load type is LED. If not greater than the configurable threshold, the ascertaining can ascertain that the load is non-LED ('other' than an LED type of load.

The selected parameters can include a dimming mode of the dimmer, selected as between two or more different dimming modes. For instance, the selection is between a forward dimming mode and a reverse dimming mode.

The process can also include determining a proper time to fire the first pulse. To this end, the process can monitor timing of phases of the supply of power and ascertain therefrom timing of zero-crossings of the supply of power. The first starting time at which the first pulse is applied may be substantially at a zero-crossing (i.e. within some amount of time of the actual zero-crossing, for instance, and in some embodiments should be as close to the zero-crossing as possible based on delays in the zero-crossing circuitry and microcontroller processing).

Applying the first control pulse and applying the second control pulse can occur during the same half-phase of the supply of power. For instance, the first starting time, first ending time, second starting time, and second ending time can all fall within the half-phase. Detection of the load type can occur extremely fast, as it includes the time it would take to perform the comparison and correlate the result to load type and/or dimming mode. This enables fast selection of the mode and near-immediate application of the proper dimming control using the appropriate dimming mode. In some examples, the load is detected and the mode (forward or reverse) is selected and configured by the end of the half-cycle during which the pulses were applied, e.g. before the start of the immediately-following half-cycle. Thus, the half-phase for the pulsing can be a first half-phase that transitions to a second half-phase sequentially subsequent to the first half-phase, and the controller can be configured to perform, prior to beginning that second half-phase: the comparing the current levels, the ascertaining the load type, the selecting the parameters, and additionally applying those selected parameters to configure the dimmer to operate in a forward dimming mode or a reverse dimming mode. Alternatively, the mode configuration could occur in the second half-phase or thereafter, if desired.

Load type detection can be based on how well the current levels follow the line power sine wave. Based on the timing of the pulses, certain current levels are expected to be seen. A 25-27% difference between first and second current levels may be normal for an incandescent bulb depending on the timing of the pulses during the half-phase. That same pulsing for an LED load type may result in a spike of current that is double during the second pulse what it was during the first pulse. Consequently, some threshold percentage difference, for instance 130%, can be configured. Based on the second current level being at least that threshold percent of the first current level, the ascertaining can determine that the load type is a light-emitting diode (LED).

The closer together and nearer the zero-crossing the multiple pulses are, the least noticeable the 'flicker' would be to a user. Some example durations and times presented herein may complete the detection in a time imperceptible to users. The first starting time may be between 0.9 and 1.0 milliseconds after a zero-crossing in some examples. The first duration of time may be between 0.8 and 1.2 milliseconds in some examples. Additionally or alternatively, the first duration of time may be longer than the second duration of time. The switching circuit can remain in the OFF state during a delay period between the first ending time (end of the first pulse) and the second starting time (begin of the second pulse). The delay period can be between 100 and 200 microseconds in some examples. An example second duration of time is between 100 and 200 microseconds.

FIGS. 9A-9D present example processes described herein. The processes can be performed by one or more apparatuses, such as one or more dimmers as described herein. The dimmer can be for controlling conduction of a supply of power to a lighting load. The dimmer can include, as an example, a line input terminal and a load output terminal, the line input terminal configured to be electrically coupled to the supply of power, and the load output terminal configured to be electrically coupled to the lighting load. The dimmer can further include a switching circuit electrically coupled in series between the line input terminal and the load output terminal, the switching circuit configured to be selectively controlled between an ON state, in which the switching circuit conducts the supply of power to the lighting load, and an OFF state. The dimmer can further include a controller, such as a microcontroller. The controller can be configured (i.e. via program instructions or other operations that execute via one or more processors) to perform aspects of processes described herein.

Additionally or alternatively, aspects of one or more processes can be performed by one or more other computer systems that are, optionally, in communication with such a dimmer to, e.g., configure the dimmer in accordance with aspects described herein.

Figure 9A:
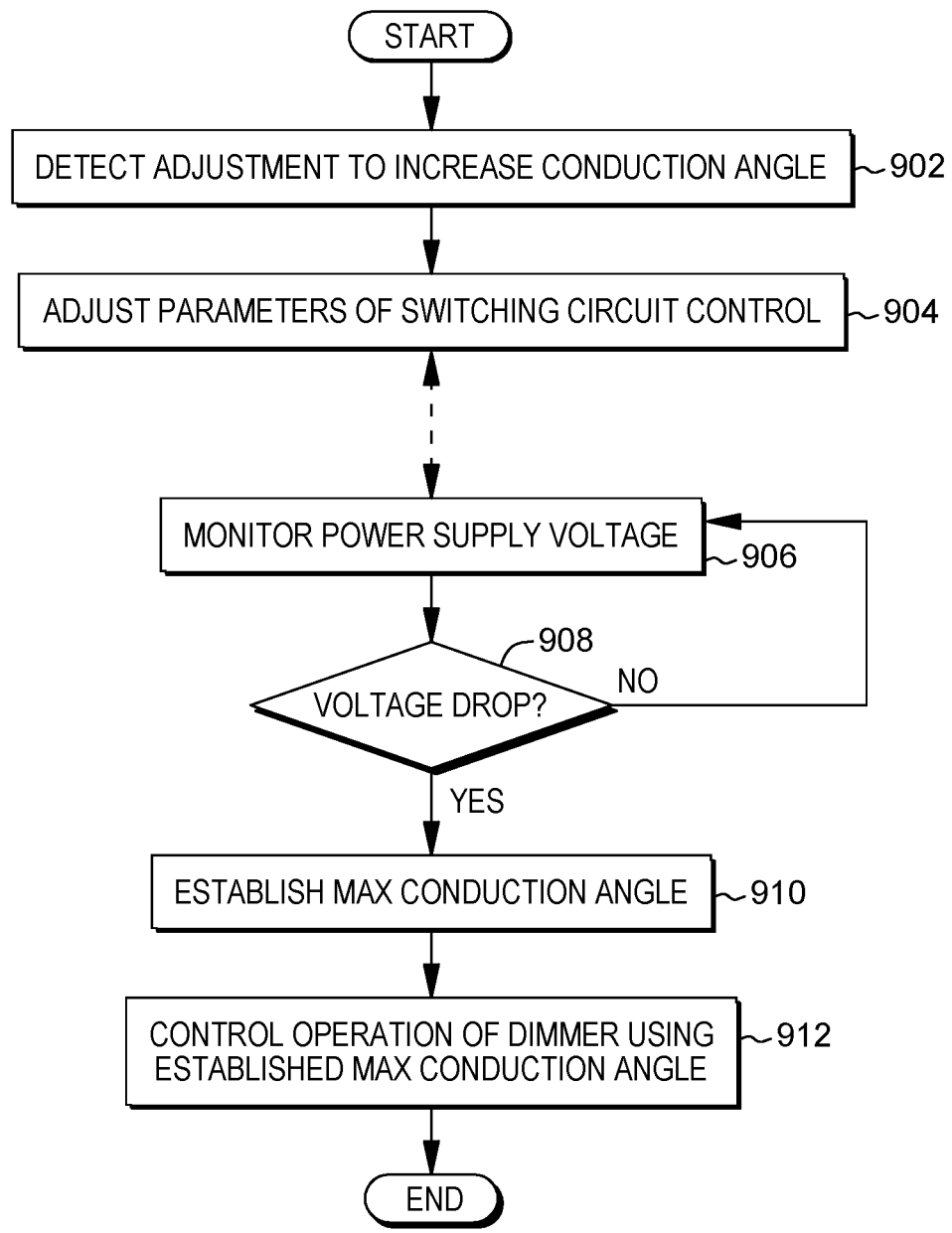
FIG. 9A depicts an example process for controlling conduction of a supply of power to a lighting load based on voltage of a dimmer power supply, in accordance with aspects described herein.

FIG. 9A depicts an example process for controlling conduction of a supply of power to a lighting load based on voltage of a dimmer power supply, in accordance with aspects described herein. The process begins by detecting (902) an adjustment to increase conduction angle, the conduction angle corresponding to a conduction time of the switching circuit to conduct the supply of power to the load. The detected adjustment could be an adjustment by a user using a potentiometer of the dimmer, for instance. Based on detecting the adjustment to increase the conduction angle of the dimmer, the process adjusts (904) parameters of the selective control of the switching circuit. The adjusting increases the conduction angle, which increases power to the load. Concurrent with this adjustment, e.g. while it is happening, the process monitors (906) a voltage of a power supply of the dimmer. The voltage could be input or output power of the power supply, for instance. The voltage is initially substantially a first voltage, for instance within 5% of a given voltage value, for instance 15 volts (V).

The process determines (908) whether there is a voltage drop from substantially the first voltage (e.g. ~15V) to a second, lower voltage. The second voltage could be a preset voltage for instance. If it is determined at 908 that such voltage drop has not occurred (908, NO), the process returns to 906 to continue monitoring. Otherwise (908, YES) the monitoring has detected that the voltage falls from substantially the first voltage to the second, lower voltage. Based on the monitoring detecting that the voltage falls from substantially the first voltage to a second, lower voltage, the process establishes (910) a maximum conduction angle for the dimmer. The maximum conduction angle is established as a function of (i) the conduction angle of the dimmer when the voltage is detected to have fallen to the second voltage and (ii) an offset.

In some examples, the maximum conduction angle is set at the conduction angle of the dimmer when the voltage is detected to have fallen to the second voltage minus the offset. Establishing the maximum conduction angle can therefore include decreasing (by the offset) an angle at which the switching circuit is configured to be selectively controlled to switch to the OFF state. The offset can be a predetermined number of angular degrees, which could correspond to a fixed amount of time. Alternatively, the offset could be a fixed percentage of the conduction angle of the dimmer when the voltage is detected to have fallen to the second voltage.

Establishing the maximum conduction angle can include increasing an angle at which the switching circuit is configured to be selectively controlled to switch to the ON state. This may include additional aspects laid out herein, for instance those with reference to FIG. 9D.

Referring back to FIG. 9A, the process continues by controlling operation (912) of the dimmer using the established maximum conduction angle. By 'controlling operation' is meant performing user-desired dimming operations subject to the established maximum conduction angle.

The second voltage can be a predetermined voltage lower than the first voltage, the predetermined voltage being set as a function of the first voltage, for instance. Additionally or alternatively, the second voltage could be the voltage at which the instantaneous drop in voltage reaches a certain threshold, i.e. the rate of the drop reaches some configurable threshold.

Figure 9B:
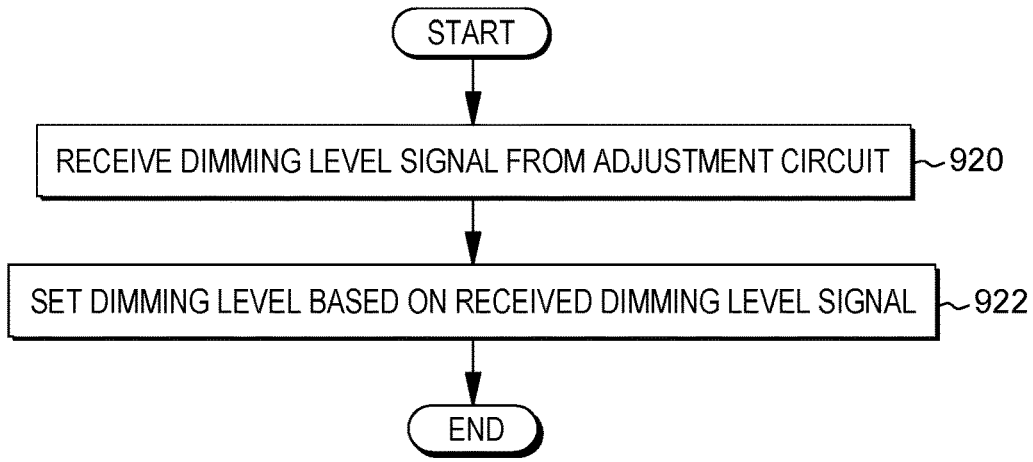
FIG. 9B depicts an example process for controlling conduction of a supply of power to a lighting load based on a dimming level signal provided by a dimming level adjustment circuit, in accordance with aspects described herein.

FIG. 9B depicts an example process for controlling conduction of a supply of power to a lighting load based on a dimming level signal provided by a dimming level adjustment circuit, in accordance with aspects described herein. The example dimmer includes, in addition to a line input terminal and a load output terminal, switching circuit, and controller, a dimming level adjustment circuit electrically coupled between a dimmer power supply voltage and the controller of the dimmer. The adjustment circuit could be a potentiometer, for instance. The dimming level adjustment circuit may be configured to provide a dimming level signal to the controller. The dimming level signal can indicate a desired dimming level for the dimmer, for instance a setpoint for brightness. In addition, a maximum value of the dimming level signal, and therefore a maximum configurable desired dimming level for the dimmer, could be based on dimmer power supply voltage. As described previously, the dimmer power supply voltage (e.g. ~15V) could power the dimming level adjustment circuit such that a drop in that power supply voltage directly affects the dimming level signal from the dimming level adjustment circuit. The dimmer controller can be configured to perform receiving (920) the dimming level signal from the dimming level adjustment circuit, and then setting (922) a dimming level for the dimmer based on the received dimming level signal.

In this manner, the maximum possible brightness as indicated by the dimming level adjustment circuit is based on power supply voltage. Based on the dimming level adjustment circuit being adjusted to increase the dimming level signal being provided to the controller, the maximum value of the dimming level signal may be reached and limited by the dimmer power supply voltage. In this situation, based on further adjustment to the dimming level adjustment circuit to increase the dimming level signal, the dimming level signal could remain at the maximum value of the dimming level signal. This is to say that the set maximum is truly the maximum despite the adjustment circuit potentially having additional room for increase. As long as the power supply voltage does not drop with an increase in the potentiometer, the maximum brightness will increase. When the voltage drops or fails to increase further, the maximum is set. A downward adjustment will not reset the maximum of the dimmer but will result in a dimming of the load.

Figure 9C:
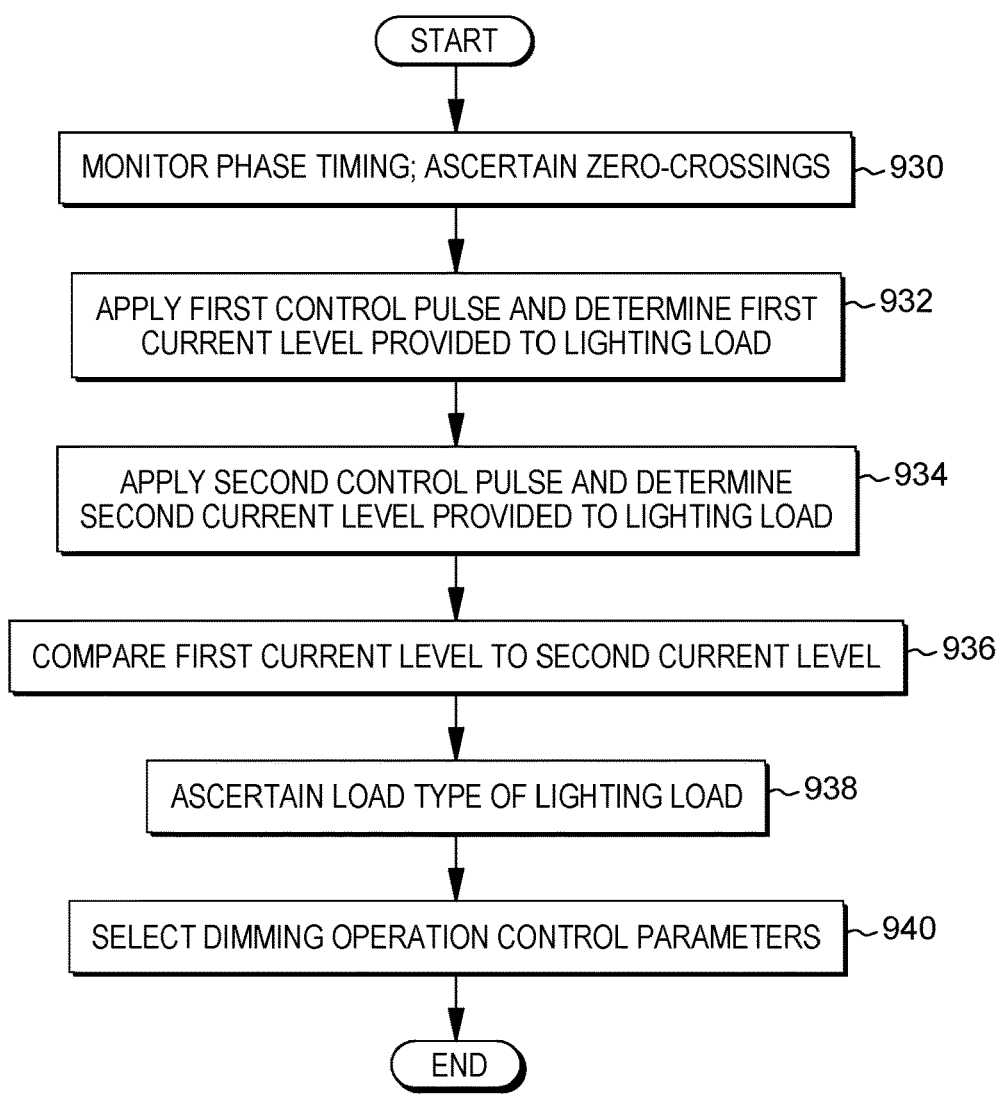
FIG. 9C depicts an example process for detecting a load type and selecting dimming operation control parameters based thereon, in accordance with aspects described herein.

FIG. 9C depicts an example process for detecting a load type and selecting dimming operation control parameters based thereon, in accordance with aspects described herein. The parameters may be for controlling dimming operation with a transistor-based switching circuit, for instance. The process at 930 initially monitors timing of phases of the supply of power (where each phase includes a positive half-phase of positive voltage and a negative half-phase of negative voltage) and ascertains therefrom the timing of zero-crossings of the supply of power, with each zero-crossing being a transition between concurrent half-phases of the supply of power. The process applies (932) a first control pulse to the switching circuit to switch the switching circuit into the ON state from the OFF state to conduct the supply of power to the lighting load, the first control pulse beginning at a first starting time and extending for a first duration of time that ends at a first ending time, and detects level(s) of current provided to the load during that first duration of time as a result of applying the first control pulse. In some applications, the first control pulse may be a steady pulse held for the first duration of time, though in other applications the first control pulse is actually a series of relatively rapid pulses. For MOSFETs, the gate may be held for the duration of time, while for TRIAC applications, in many cases it is sufficient to have a sequence of short pulses. In some examples, the first starting time is substantially at a zero-crossing, which means within some amount of time after the true zero-crossing.

The process continues by applying (934) a second control pulse to the switching circuit to switch the switching circuit into the ON state from the OFF state to conduct the supply of power to the lighting load, the second control pulse beginning at a second starting time, after the first ending time, and extending for a second duration of time that ends at a second ending time, and detecting level(s) of current provided to the lighting load during the second duration of time as a result of applying the second control pulse. In some examples, applying the first control pulse and applying the second control pulse (i.e. the first and second starting times) occur during a same half-phase of the supply of power. In yet a further example, the first starting time, first ending time, second starting time, and second ending time occur within that half-phase. The first starting time is between 0.9 and 1.0 milliseconds, as an example, after a zero-crossing of the supply of power. The first duration of time may be longer than the second duration of time, for instance the first duration of time is between 0.8 and 1.2 milliseconds. The switching circuit in some examples remains in the OFF state during a delay period between the first ending time and the second starting time. The delay period is between 100 and 200 microseconds in some examples. An example second duration of time is between 100 and 200 microseconds.

Continuing with the process of FIG. 9C, the process compares (936) a first current level determined based on applying the first control pulse to a second current level determined based on applying the second control pulse. Since possibly multiple current levels were detected during each of the first and second pulses, various possibilities exist for what is selected as the first current level and the second current level to be compared. In one example, one or both of the first and second current levels is/are the peak current level provided to the load during the respective duration of time. Additionally or alternatively, one or both is/are the average of the current levels during the respective duration of time. In a particular example, the first current level is the peak current level provided to the lighting load during the first duration of time or an average of current levels provided to the lighting load during the first duration of time.

Based on the comparing (936), the process then ascertains (938) a load type of the lighting load. For example, the ascertaining ascertains the load type as between (i) a light emitting diode (LED) load type and (ii) a non-LED load type. The comparing can determine a percentage difference between the first current level and the second current level, and based on the difference being greater than a threshold, the ascertaining ascertains that the load type is LED. Based on the second current level being at least some level relative to the first current level, for instance 130% of the first current level, the ascertaining can ascertain that the load type is light-emitting diode (LED).

The process then selects (940), based on the ascertained load type, parameters that control dimming operation of the dimmer. The parameters can include at least a dimming mode of the dimmer, selected as one of: a forward phase dimming mode or a reverse phase dimming mode.

The half-phase can be a first half-phase that transitions to a second half-phase of the supply of power that is sequentially subsequent to the first half-phase. The controller of the dimmer can perform the comparing (936), the ascertaining (938), the selecting (940) and also applying the selected parameters to configure the dimmer to operate in a forward dimming mode or a reverse dimming mode, all prior to beginning the second half-phase.

Figure 9D:
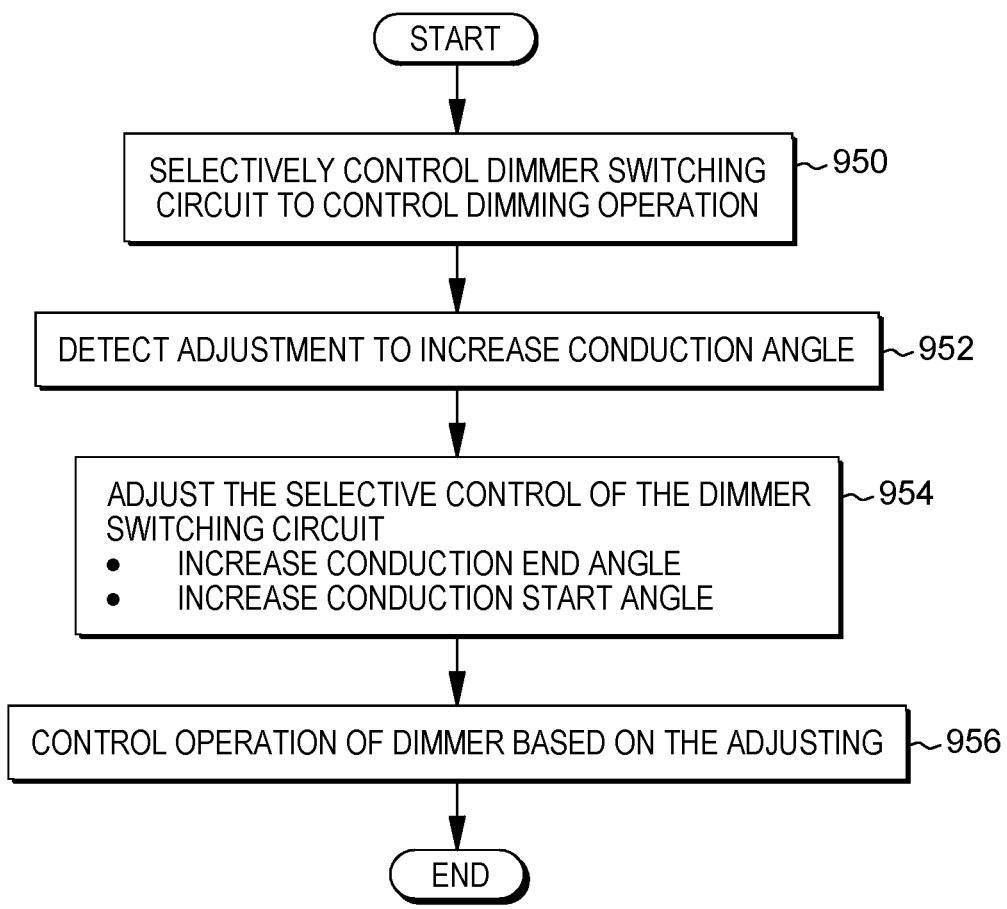
FIG. 9D depicts an example process for adjusting selective control of a dimmer switching circuit, in accordance with aspects described herein.

FIG. 9D depicts an example process for adjusting selective control of a dimmer switching circuit, in accordance with aspects described herein. In a dimmer as described herein, a controller performs a process that includes selectively controlling (950) the switching circuit between the ON state and the OFF state to control dimming operation of the dimmer according to a conduction angle corresponding to a conduction time for the switching circuit to conduct the supply of power to the load during each half-phase of a plurality of half-phases of the supply of power. The conduction angle is defined by a conduction start angle and a conduction stop angle, the conduction start angle being an angle of the half-phase at which the switching circuit is switch to the ON state to conduct the supply of power to the lighting load, and the conduction end angle being an angle of the half-phase at which the switching circuit is switch to the OFF state to cease conducting the supply of power to the lighting load. The process detects (952) an adjustment to increase the conduction angle, for instance a user raises a potentiometer actuator. Based on detecting that adjustment to increase the conduction angle, the process adjusts (954) the selective control of the switching circuit. This adjusting includes two aspects. The first is to increase the conduction end angle from a first conduction end angle (e.g. the currently configured conduction end angle) to a second conduction end angle that is greater than the first conduction end angle. It is understood that this adjustment to the conduction end angle correlates directly to imparting a further delay in opening the switching circuit to stop conduction of the power to the load for the remainder of the half-phase. The second is to increase the conduction start angle from a first conduction start angle to a second conduction end angle greater than the first conduction start angle. This adjustment to the conduction start angle correlates directly to imparting a further delay in closing the switching circuit to start conduction of power to the load. The increases in the conduction end angle and the conduction start angle are such that the result is a net increase in the conduction angle (conduction period/time/duration) so that the user's call for increased brightness is successful.

The first conduction start angle can initially be substantially at a zero-crossing of the supply of power, the zero-crossing being a transition between consecutive half-phases of the supply of power. An amount of the increase in the conduction start angle from the first conduction start angle to the second conduction start angle can be a fixed number of angular degrees, which corresponds to a fixed delay time. An amount of the increase in the conduction start angle from the first conduction start angle to the second conduction start angle can be based on the second conduction end angle. In other words, how much to delay the firing can be based on how late in the half-phase the switch opens to stop conduction of power to the load. Additionally or alternatively, the amount of the increase in the conduction start angle can be a mathematical function of at least the second conduction end angle, where different second conduction end angles correspond to different amounts of the increase in the conduction start angle. Similarly, in some embodiments the amount of increase in the conduction start angle is a function of at least the first conduction end angle, where different first conduction end angles correspond to different amounts of the increase in the conduction start angle.

The amount of the increase in the conduction start angle from the first conduction start angle to the second conduction start angle could in some examples be based on an amount of the increase in the conduction end angle from the first conduction end angle to the second conduction end angle. For instance, the amount of the increase in the conduction start angle could be a mathematical function of at least the amount of the increase in the conduction end angle, where different amounts of increase in the conduction end angle correspond to different amount of the increase in the conduction start angle.

In some embodiments, the amount of the increase in the conduction start angle from the first conduction start angle to the second conduction start angle can be forced to be no greater than a predefined maximum. The predefined maximum could correspond to between 0.9 and 1.21 milliseconds, for instance.

Returning to FIG. 9D, the process continues after making the adjustments to the conduction end angle and conduction angle, by controlling (956) operation of the dimmer based on the adjusting. For instance, the controller controls operation of the dimmer such that the switching circuit fires at the second conduction end angle and opens at the second conduction end angle.

Although various examples are provided, variations are possible without departing from a spirit of the claimed aspects.

Figure 10:
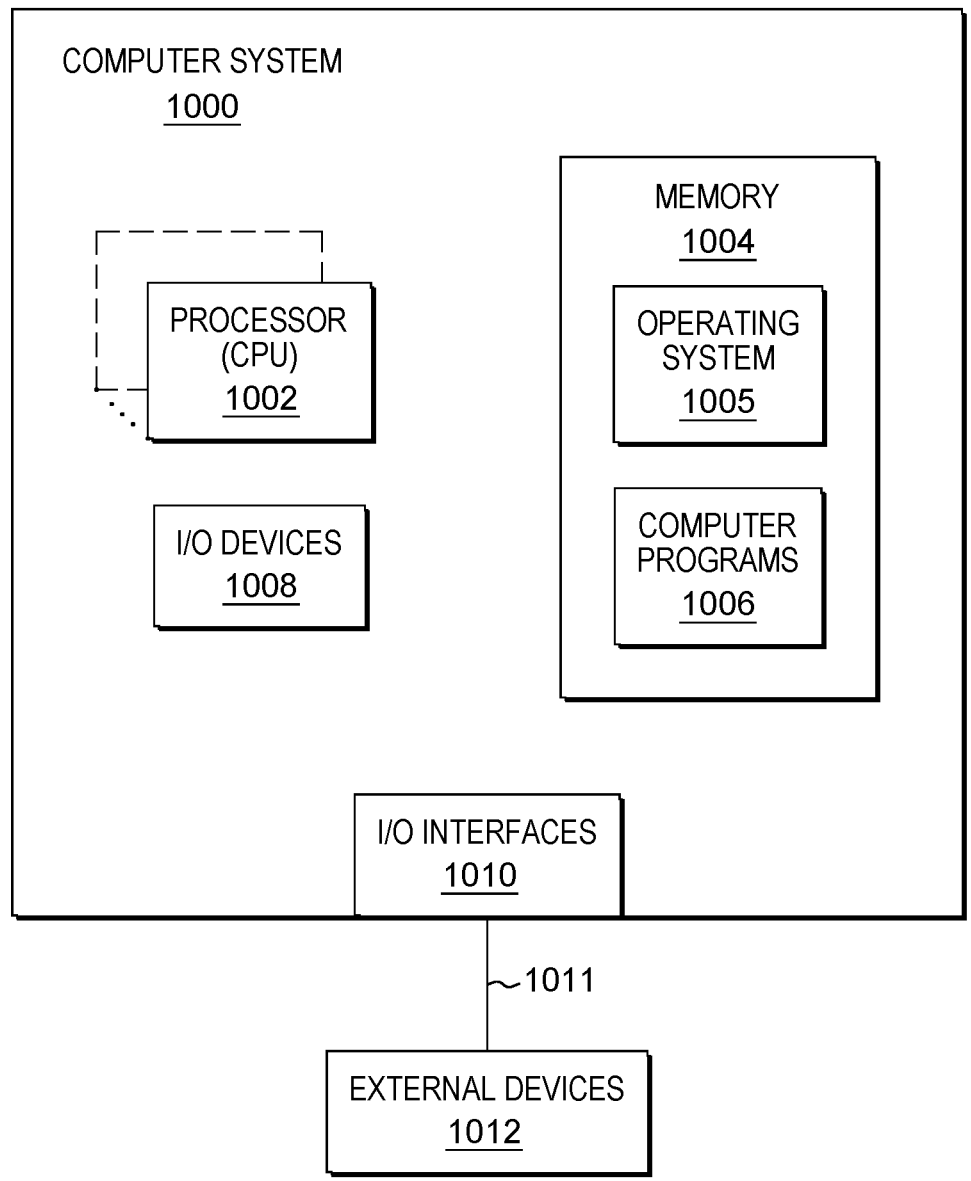
FIG. 10 depicts one example of a computer system and associated devices to incorporate and/or use aspects described herein.

Systems described herein, including those referred to herein as dimmers, may be regarded in some respects as a computer system capable of executing program instructions to perform processes/methods. Thus, processes as described herein may be performed by one or more computer systems, such as those described herein, which may include one or more dimmers/dimming systems and/or one or more computer systems of or connected thereto, such as one or more cloud servers, one or more user personal computers such as a smartphone, tablet, or other device, and/or one or more other computer systems. FIG. 10 depicts one example of a computer system and associated devices to incorporate and/or use aspects described herein. A computer system may also be referred to herein as a data processing device/system, computing device/system/node, or simply a computer. The computer system may be based on one or more of various system architectures and/or instruction set architectures.

FIG. 10 shows a computer system 1000 in communication with external device(s) 1012. Computer system 1000 includes one or more processor(s) 1002, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 1002 can also include register(s) to be used by one or more of the functional components. Computer system 1000 also includes memory 1004, input/output (I/O) devices 1008, and I/O interfaces 1010, which may be coupled to processor(s) 1002 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1004 can be or include main or system memory (e.g. Random Access Memory) used in the execution of program instructions, storage device(s) such as hard drive(s), flash media, or optical media as examples, and/or cache memory, as examples. Memory 1004 can include, for instance, a cache, such as a shared cache, which may be coupled to local caches (examples include L1 cache, L2 cache, etc.) of processor(s) 1002. Additionally, memory 1004 may be or include at least one computer program product having a set (e.g., at least one) of program modules, instructions, code or the like that is/are configured to carry out functions of embodiments described herein when executed by one or more processors.

Memory 1004 can store an operating system 1005 and other computer programs 1006, such as one or more computer programs/applications that execute to perform aspects described herein. Specifically, programs/applications can include computer readable program instructions that may be configured to carry out functions of embodiments of aspects described herein.

Examples of I/O devices 1008 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (1012) coupled to the computer system through one or more I/O interfaces 1010.

Computer system 1000 may communicate with one or more external devices 1012 via one or more I/O interfaces 1010. Example external devices include a keyboard, a pointing device, a display, and/or any other devices that enable a user to interact with computer system 1000. Other example external devices include any device that enables computer system 1000 to communicate with one or more other computing systems or peripheral devices such as a printer. A network interface/adapter is an example I/O interface that enables computer system 1000 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 1010 and external devices 1012 can occur across wired and/or wireless communications link(s) 1011, such as Ethernet-based wired or wireless connections. Example wireless connections include cellular, Wi-Fi, Bluetooth®, proximity-based, near-field, or other types of wireless connections. More generally, communications link(s) 1011 may be any appropriate wireless and/or wired communication link(s) for communicating data.

Particular external device(s) 1012 may include one or more data storage devices, which may store one or more programs, one or more computer readable program instructions, and/or data, etc. Computer system 1000 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 1000 may be operational with numerous other general purpose or special purpose computing system environments or configurations. Computer system 1000 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Embodiments of the present invention may be a system, a method, and/or a computer program product, any of which may be configured to perform or facilitate aspects described herein.

In some embodiments, aspects of the present invention may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C#, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples. For example, computing environments of other architectures can be used to incorporate and use one or more embodiments.

Provided is a small sampling of embodiments of the present invention, as described herein:

A1. A dimmer for controlling conduction of a supply of power to a lighting load, the dimmer comprising: a line input terminal and a load output terminal, the line input terminal configured to be electrically coupled to the supply of power, and the load output terminal configured to be electrically coupled to the lighting load; a switching circuit electrically coupled in series between the line input terminal and the load output terminal, the switching circuit configured to be selectively controlled between an ON state, in which the switching circuit conducts the supply of power to the lighting load, and an OFF state; and a controller, the controller configured to perform: based on detecting an adjustment to increase a conduction angle of the dimmer, the conduction angle corresponding to a conduction time of the switching circuit to conduct the supply of power to the load, adjusting parameters of the selective control of the switching circuit, the adjusting increasing the conduction angle; concurrent with the adjusting, monitoring a voltage of a power supply of the dimmer, the voltage initially being substantially a first voltage; based on the monitoring detecting that the voltage falls from substantially the first voltage to a second, lower voltage, establishing a maximum conduction angle for the dimmer, the maximum conduction angle being a function of (i) the conduction angle of the dimmer when the voltage is detected to have fallen to the second voltage and (ii) an offset; and controlling operation of the dimmer using the established maximum conduction angle.

A2. The dimmer of A1, wherein the establishing the maximum conduction angle sets the maximum conduction angle at the conduction angle of the dimmer when the voltage is detected to have fallen to the second voltage minus the offset.

A3. The dimmer of A1 or A2, wherein the offset is a predetermined number of angular degrees.

A4. The dimmer of A1 or A2, wherein the offset is a fixed percentage of the conduction angle of the dimmer when the voltage is detected to have fallen to the second voltage.

A5. The dimmer of A1, A2, A3 or A4, wherein the establishing the maximum conduction angle comprises decreasing an angle at which the switching circuit is configured to be selectively controlled to switch to the OFF state.

A6. The dimmer of A1, A2, A3, A4 or A5, wherein the establishing the maximum conduction angle comprises increasing an angle at which the switching circuit is configured to be selectively controlled to switch to the ON state.

A7. The dimmer of A1, A2, A3, A4, A5 or A6, wherein the first voltage is a voltage value and wherein substantially the first voltage is defined to be within 5% of the voltage value.

A8. The dimmer of A1, A2, A3, A4, A5, A6 or A7, wherein the second voltage is a predetermined voltage lower than the first voltage, the predetermined voltage being set as a function of the first voltage.

A9. A method for controlling conduction of a supply of power to a lighting load, the method comprising: detecting an adjustment to increase a conduction angle of a dimmer, the conduction angle corresponding to a conduction time of a switching circuit of the dimmer to conduct a supply of power to the lighting load, the switching circuit electrically being coupled in series between a line input terminal and a load output terminal, the line input terminal configured to be electrically coupled to the supply of power and the load output terminal configured to be electrically coupled to the lighting load, and the switching circuit configured to be selectively controlled between an ON state, in which the switching circuit conducts the supply of power to the lighting load, and an OFF state; based on detecting the adjustment, adjusting parameters of the selective control of the switching circuit, the adjusting increasing the conduction angle; concurrent with the adjusting, monitoring a voltage of a power supply of the dimmer, the voltage initially being substantially a first voltage; based on the monitoring detecting that the voltage falls from substantially the first voltage to a second, lower voltage, establishing a maximum conduction angle for the dimmer, the maximum conduction angle being a function of (i) the conduction angle of the dimmer when the voltage is detected to have fallen to the second voltage and (ii) an offset; and controlling operation of the dimmer using the established maximum conduction angle.

A10. The method of A9, wherein the establishing the maximum conduction angle sets the maximum conduction angle at the conduction angle of the dimmer when the voltage is detected to have fallen to the second voltage minus the offset.

A11. The method of A9 or A10, wherein the offset is a predetermined number of angular degrees.

A12. The method of A9 or A10, wherein the offset is a fixed percentage of the conduction angle of the dimmer when the voltage is detected to have fallen to the second voltage.

A13. The method of A9, A10, A11 or A12, wherein the establishing the maximum conduction angle comprises decreasing an angle at which the switching circuit is configured to be selectively controlled to switch to the OFF state.

A14. The method of A9, A10, A11, A12 or A13, wherein the establishing the maximum conduction angle comprises increasing an angle at which the switching circuit is configured to be selectively controlled to switch to the ON state.

A15. The method of A9, A10, A11, A12, A13 or A14, wherein the first voltage is a voltage value and wherein substantially the first voltage is defined to be within 5% of the voltage value.

A16. The method of A9, A10, A11, A12, A13, A14 or A15, wherein the second voltage is a predetermined voltage lower than the first voltage, the predetermined voltage being set as a function of the first voltage.

A17. A computer program product for controlling conduction of a supply of power to a lighting load, the computer program product comprising: a computer readable storage medium readable by a processing circuit and storing instructions for execution by the processing circuit to perform a method comprising: detecting an adjustment to increase a conduction angle of a dimmer, the conduction angle corresponding to a conduction time of a switching circuit of the dimmer to conduct a supply of power to a lighting load, the switching circuit electrically being coupled in series between a line input terminal and a load output terminal, the line input terminal configured to be electrically coupled to the supply of power and the load output terminal configured to be electrically coupled to the lighting load, and the switching circuit configured to be selectively controlled between an ON state, in which the switching circuit conducts the supply of power to the lighting load, and an OFF state; based on detecting the adjustment, adjusting parameters of the selective control of the switching circuit, the adjusting increasing the conduction angle; concurrent with the adjusting, monitoring a voltage of a power supply of the dimmer, the voltage initially being substantially a first voltage; based on the monitoring detecting that the voltage falls from substantially the first voltage to a second, lower voltage, establishing a maximum conduction angle for the dimmer, the maximum conduction angle being a function of (i) the conduction angle of the dimmer when the voltage is detected to have fallen to the second voltage and (ii) an offset; and controlling operation of the dimmer using the established maximum conduction angle.

A18. The computer program product of A17, wherein the establishing the maximum conduction angle sets the maximum conduction angle at the conduction angle of the dimmer when the voltage is detected to have fallen to the second voltage minus the offset.

A19. The computer program product of A17 or A18, wherein the offset is a predetermined number of angular degrees.

A20. The computer program product of A17 or A18, wherein the offset is a fixed percentage of the conduction angle of the dimmer when the voltage is detected to have fallen to the second voltage.

A21. The computer program product of A17, A18, A19 or A20, wherein the establishing the maximum conduction angle comprises decreasing an angle at which the switching circuit is configured to be selectively controlled to switch to the OFF state.

A22. The computer program product of A17, A18, A19, A20 or A21, wherein the establishing the maximum conduction angle comprises increasing an angle at which the switching circuit is configured to be selectively controlled to switch to the ON state.

A23. The computer program product of A17, A18, A19, A20, A21 or A22, wherein the first voltage is a voltage value and wherein substantially the first voltage is defined to be within 5% of the voltage value.

A24. The computer program product of A17, A18, A19, A20, A21, A22 or A23, wherein the second voltage is a predetermined voltage lower than the first voltage, the predetermined voltage being set as a function of the first voltage.

B1. A dimmer for controlling conduction of a supply of power to a lighting load, the dimmer comprising: a line input terminal and a load output terminal, the line input terminal configured to be electrically coupled to the supply of power, and the load output terminal configured to be electrically coupled to the lighting load; a switching circuit electrically coupled in series between the line input terminal and the load output terminal, the switching circuit configured to be selectively controlled between an ON state, in which the switching circuit conducts the supply of power to the lighting load, and an OFF state; a controller; and a dimming level adjustment circuit electrically coupled between a dimmer power supply voltage and the controller of the dimmer, wherein the dimming level adjustment circuit is configured to provide a dimming level signal to the controller, the dimming level signal indicating a desired dimming level for the dimmer, wherein a maximum value of the dimming level signal, and therefore a maximum configurable desired dimming level for the dimmer, is based on the dimmer power supply voltage, wherein the controller is configured to perform: receiving the dimming level signal from the dimming level adjustment circuit; and setting a dimming level for the dimmer based on the received dimming level signal.

B2. The dimmer of B1, wherein based on the dimming level adjustment circuit being adjusted to increase the dimming level signal being provided to the controller, the maximum value of the dimming level signal is reached and limited by the dimmer power supply voltage, wherein based on further adjustment to the dimming level adjustment circuit to increase the dimming level signal, the dimming level signal remains at the maximum value of the dimming level signal.

B3. The dimmer of B1 or B2, wherein the dimming level adjustment circuit comprises a potentiometer.

B4. A method for controlling conduction of a supply of power to a lighting load, the method comprising: receiving a dimming level signal from a dimming level adjustment circuit, the dimming level adjustment circuit electrically coupled between a dimmer power supply voltage and a controller of the dimmer, wherein the dimming level adjustment circuit is configured to provide the dimming level signal to the controller, the dimming level signal indicating a desired dimming level for the dimmer, wherein a maximum value of the dimming level signal, and therefore a maximum configurable desired dimming level for the dimmer, is based on the dimmer power supply voltage; and setting a dimming level for the dimmer based on the received dimming level signal.

B5. The method of B4, wherein based on the dimming level adjustment circuit being adjusted to increase the dimming level signal being provided to the controller, the maximum value of the dimming level signal is reached and limited by the dimmer power supply voltage, wherein based on further adjustment to the dimming level adjustment circuit to increase the dimming level signal, the dimming level signal remains at the maximum value of the dimming level signal.

B6. The method of B4 or B5, wherein the dimming level adjustment circuit comprises a potentiometer.

B7. A computer program product for controlling conduction of a supply of power to a lighting load, the computer program product comprising: a computer readable storage medium readable by a processing circuit and storing instructions for execution by the processing circuit to perform a method comprising: receiving a dimming level signal from a dimming level adjustment circuit, the dimming level adjustment circuit electrically coupled between a dimmer power supply voltage and a controller of the dimmer, wherein the dimming level adjustment circuit is configured to provide the dimming level signal to the controller, the dimming level signal indicating a desired dimming level for the dimmer, wherein a maximum value of the dimming level signal, and therefore a maximum configurable desired dimming level for the dimmer, is based on the dimmer power supply voltage; and setting a dimming level for the dimmer based on the received dimming level signal.

B8. The computer program product of B7, wherein based on the dimming level adjustment circuit being adjusted to increase the dimming level signal being provided to the controller, the maximum value of the dimming level signal is reached and limited by the dimmer power supply voltage, wherein based on further adjustment to the dimming level adjustment circuit to increase the dimming level signal, the dimming level signal remains at the maximum value of the dimming level signal.

B9. The computer program product of B7 or B8, wherein the dimming level adjustment circuit comprises a potentiometer.

C1. A dimmer for controlling conduction of a supply of power to a lighting load, the dimmer comprising: a line input terminal and a load output terminal, the line input terminal configured to be electrically coupled to the supply of power, and the load output terminal configured to be electrically coupled to the lighting load; a switching circuit electrically coupled in series between the line input terminal and the load output terminal, the switching circuit configured to be selectively controlled via control pulses between an ON state, in which the switching circuit conducts the supply of power to the lighting load, and an OFF state; and a controller, the controller configured to perform: applying a first control pulse to the switching circuit to switch the switching circuit into the ON state from the OFF state to conduct the supply of power to the lighting load, the first control pulse beginning at a first starting time and extending for a first duration of time that ends at a first ending time; applying a second control pulse to the switching circuit to switch the switching circuit into the ON state from the OFF state to conduct the supply of power to the lighting load, the second control pulse beginning at a second starting time, after the first ending time, and extending for a second duration of time that ends at a second ending time; detecting levels of current provided to the lighting load during the first duration of time as a result of applying the first control pulse and during the second duration of time as a result of applying the second control pulse; comparing a first current level determined based on applying the first control pulse to a second current level determined based on applying the second control pulse; based on the comparing, ascertaining a load type of the lighting load; and selecting, based on the ascertained load type, parameters that control dimming operation of the dimmer.

C2. The dimmer of C1, wherein the second current level is a peak current level provided to the lighting load during the second duration of time.

C3. The dimmer of C2, wherein the first current level is selected from the group consisting of: (i) a peak current level provided to the lighting load during the first duration of time and (ii) an average of current levels provided to the lighting load during the first duration of time.

C4. The dimmer of C1, C2 or C3, wherein the comparing determines a percentage difference between the first current level and the second current level, and wherein based on the difference being greater than a threshold, the ascertaining ascertains that the load type is LED.

C5. The dimmer of C1, C2, C3 or C4, wherein the ascertaining ascertains the load type as between (i) a light emitting diode (LED) load type and (ii) a non-LED load type.

C6. The dimmer of C1, C2, C3, C4 or C5, wherein the parameters comprise at least a dimming mode of the dimmer.

C7. The dimmer of C6, wherein the dimming mode is selected from the group consisting of: a forward dimming mode and a reverse dimming mode.

C8. The dimmer of claim C1, C2, C3, C4, C5, C6 or C7, wherein the controller is further configured to perform: monitoring timing of phases of the supply of power, each phase comprising a positive half-phase of positive voltage and a negative half-phase of negative voltage; and ascertaining timing of zero-crossings of the supply of power, each zero-crossing being a transition between concurrent half-phases of the supply of power.

C9. The dimmer of C1, C2, C3, C4, C5, C6, C7 or C8, wherein the first starting time is substantially at a zero-crossing.

C10. The dimmer of C1, C2, C3, C4, C5, C6, C7, C8 or C9, wherein the applying the first control pulse and the applying the second control pulse occur during a same half-phase of the supply of power.

C11. The dimmer of C10, wherein the first starting time, first ending time, second starting time, and second ending time occur within the half-phase.

C12. The dimmer of C10 or C11, wherein the half-phase is a first half-phase, wherein the first half-phase transitions to a second half-phase of the supply of power that is sequentially subsequent to the first half-phase, wherein the controller is configured to perform, prior to beginning the second half-phase: the comparing, the ascertaining, and the selecting; and applying the selected parameters to configure the dimmer to operate in a forward dimming mode or a reverse dimming mode.

C13. The dimmer of C1, C2, C3, C4, C5, C6, C7, C8, C9, C10, C11 or C12, wherein the first starting time is between 0.9 and 1.0 milliseconds after a zero-crossing of the supply of power.

C14. The dimmer of C1, C2, C3, C4, C5, C6, C7, C8, C9, C10, C11, C12 or C13, wherein the first duration of time is longer than the second duration of time.

C15. The dimmer of C1, C2, C3, C4, C5, C6, C7, C8, C9, C10, C11, C12, C13 or C14, wherein the first duration of time is between 0.8 and 1.2 milliseconds.

C16. The dimmer of C1, C2, C3, C4, C5, C6, C7, C8, C9, C10, C11, C12, C13, C14 or C15, wherein the switching circuit remains in the OFF state during a delay period between the first ending time and the second starting time.

C17. The dimmer of C16, wherein the delay period is between 100 and 200 microseconds.

C18. The dimmer of C1, C2, C3, C4, C5, C6, C7, C8, C9, C10, C11, C12, C13, C14, C15, C16 or C17, wherein the second duration of time is between 100 and 200 microseconds.

C19. The dimmer of C1, C2, C3, C4, C5, C6, C7, C8, C9, C10, C11, C12, C13, C14, C15, C16, C17 or C18, wherein based on the second current level being at least 130% of the first current level, the ascertaining ascertains that the load type is light-emitting diode (LED).

C20. The dimmer of C1, C2, C3, C4, C5, C6, C7, C8, C9, C10, C11, C12, C13, C14, C15, C16, C17, C18 or C19, wherein the switching circuit comprises a transistor.

C21. A method for controlling conduction of a supply of power to a lighting load, the method comprising: applying a first control pulse to a switching circuit electrically coupled in series between a line input terminal configured to be electrically coupled to a supply of power and a load output terminal configured to be electrically coupled to the lighting load, the switching circuit configured to be selectively controlled via control pulses between an ON state in which the switching circuit conducts the supply of power to the lighting load and an OFF state, the applying the first control pulse to the switching circuit being to switch the switching circuit into the ON state from the OFF state to conduct the supply of power to the lighting load, the first control pulse beginning at a first starting time and extending for a first duration of time that ends at a first ending time; applying a second control pulse to the switching circuit to switch the switching circuit into the ON state from the OFF state to conduct the supply of power to the lighting load, the second control pulse beginning at a second starting time, after the first ending time, and extending for a second duration of time that ends at a second ending time; detecting levels of current provided to the lighting load during the first duration of time as a result of applying the first control pulse and during the second duration of time as a result of applying the second control pulse; comparing a first current level determined based on applying the first control pulse to a second current level determined based on applying the second control pulse; based on the comparing, ascertaining a load type of the lighting load; and selecting, based on the ascertained load type, parameters that control dimming operation of the dimmer.

C22. The method of C21, wherein the second current level is a peak current level provided to the lighting load during the second duration of time.

C23. The method of C22, wherein the first current level is selected from the group consisting of: (i) a peak current level provided to the lighting load during the first duration of time and (ii) an average of current levels provided to the lighting load during the first duration of time.

C24. The method of C21, C22 or C23, wherein the comparing determines a percentage difference between the first current level and the second current level, and wherein based on the difference being greater than a threshold, the ascertaining ascertains that the load type is LED.

C25. The method of C21, C22, C23 or C24, wherein the ascertaining ascertains the load type as between (i) a light emitting diode (LED) load type and (ii) a non-LED load type.

C26. The method of C21, C22, C23, C24 or C25, wherein the parameters comprise at least a dimming mode of the dimmer.

C27. The method of C26, wherein the dimming mode is selected from the group consisting of: a forward dimming mode and a reverse dimming mode.

C28. The method of C21, C22, C23, C24, C25, C26 or C27, further comprising: monitoring timing of phases of the supply of power, each phase comprising a positive half-phase of positive voltage and a negative half-phase of negative voltage; and ascertaining timing of zero-crossings of the supply of power, each zero-crossing being a transition between concurrent half-phases of the supply of power.

C29. The method of C21, C22, C23, C24, C25, C26, C27 or C28, wherein the first starting time is substantially at a zero-crossing.

C30. The method of C21, C22, C23, C24, C25, C26, C27, C28 or C29, wherein the applying the first control pulse and the applying the second control pulse occur during a same half-phase of the supply of power.

C31. The method of C30, wherein the first starting time, first ending time, second starting time, and second ending time occur within the half-phase.

C32. The method of C30 or C31, wherein the half-phase is a first half-phase, wherein the first half-phase transitions to a second half-phase of the supply of power that is sequentially subsequent to the first half-phase, and wherein method further comprises performing, prior to beginning the second half-phase: the comparing, the ascertaining, and the selecting; and applying the selected parameters to configure the dimmer to operate in a forward dimming mode or a reverse dimming mode.

C33. The method of C21, C22, C23, C24, C25, C26, C27, C28, C29, C30, C31 or C32, wherein the first starting time is between 0.9 and 1.0 milliseconds after a zero-crossing of the supply of power.

C34. The method of C21, C22, C23, C24, C25, C26, C27, C28, C29, C30, C31, C32, or C33, wherein the first duration of time is longer than the second duration of time.

C35. The method of C21, C22, C23, C24, C25, C26, C27, C28, C29, C30, C31, C32, C33 or C34, wherein the first duration of time is between 0.8 and 1.2 milliseconds.

C36. The method of C21, C22, C23, C24, C25, C26, C27, C28, C29, C30, C31, C32, C33, C34 or C35, wherein the switching circuit remains in the OFF state during a delay period between the first ending time and the second starting time.

C37. The method of C36, wherein the delay period is between 100 and 200 microseconds.

C38. The method of C21, C22, C23, C24, C25, C26, C27, C28, C29, C30, C31, C32, C33, C34, C35, C36 or C37, wherein the second duration of time is between 100 and 200 microseconds.

C39. The method of C21, C22, C23, C24, C25, C26, C27, C28, C29, C30, C31, C32, C33, C34, C35, C36, C37 or C38, wherein based on the second current level being at least 130% of the first current level, the ascertaining ascertains that the load type is light-emitting diode (LED).

C40. The method of C21, C22, C23, C24, C25, C26, C27, C28, C29, C30, C31, C32, C33, C34, C35, C36, C37, C38 or C39, wherein the switching circuit comprises a transistor.

C41. A computer program product for controlling conduction of a supply of power to a lighting load, the computer program product comprising: a computer readable storage medium readable by a processing circuit and storing instructions for execution by the processing circuit to perform a method comprising: applying a first control pulse to a switching circuit electrically coupled in series between a line input terminal configured to be electrically coupled to a supply of power and a load output terminal configured to be electrically coupled to the lighting load, the switching circuit configured to be selectively controlled via control pulses between an ON state in which the switching circuit conducts the supply of power to the lighting load and an OFF state, the applying the first control pulse to the switching circuit being to switch the switching circuit into the ON state from the OFF state to conduct the supply of power to the lighting load, the first control pulse beginning at a first starting time and extending for a first duration of time that ends at a first ending time; applying a second control pulse to the switching circuit to switch the switching circuit into the ON state from the OFF state to conduct the supply of power to the lighting load, the second control pulse beginning at a second starting time, after the first ending time, and extending for a second duration of time that ends at a second ending time; detecting levels of current provided to the lighting load during the first duration of time as a result of applying the first control pulse and during the second duration of time as a result of applying the second control pulse; comparing a first current level determined based on applying the first control pulse to a second current level determined based on applying the second control pulse; based on the comparing, ascertaining a load type of the lighting load; and selecting, based on the ascertained load type, parameters that control dimming operation of the dimmer.

C42. The computer program product of C41, wherein the second current level is a peak current level provided to the lighting load during the second duration of time.

C43. The computer program product of C42, wherein the first current level is selected from the group consisting of: (i) a peak current level provided to the lighting load during the first duration of time and (ii) an average of current levels provided to the lighting load during the first duration of time.

C44. The computer program product of C41, C42 or C43, wherein the comparing determines a percentage difference between the first current level and the second current level, and wherein based on the difference being greater than a threshold, the ascertaining ascertains that the load type is LED.

C45. The computer program product of C41, C42, C43 or C44, wherein the ascertaining ascertains the load type as between (i) a light emitting diode (LED) load type and (ii) a non-LED load type.

C46. The computer program product of C41, C42, C43, C44 or C45, wherein the parameters comprise at least a dimming mode of the dimmer.

C47. The computer program product of C46, wherein the dimming mode is selected from the group consisting of: a forward dimming mode and a reverse dimming mode.

C48. The computer program product of C41, C42, C43, C44, C45, C46 or C47, wherein the method further comprises: monitoring timing of phases of the supply of power, each phase comprising a positive half-phase of positive voltage and a negative half-phase of negative voltage; and ascertaining timing of zero-crossings of the supply of power, each zero-crossing being a transition between concurrent half-phases of the supply of power.

C49. The computer program product of C41, C42, C43, C44, C45, C46, C47 or C48, wherein the first starting time is substantially at a zero-crossing.

C50. The computer program product of C41, C42, C43, C44, C45, C46, C47, C48 or C49, wherein the applying the first control pulse and the applying the second control pulse occur during a same half-phase of the supply of power.

C51. The computer program product of C50, wherein the first starting time, first ending time, second starting time, and second ending time occur within the half-phase.

C52. The computer program product of C50 or C51, wherein the half-phase is a first half-phase, wherein the first half-phase transitions to a second half-phase of the supply of power that is sequentially subsequent to the first half-phase, and wherein method further comprises performing, prior to beginning the second half-phase: the comparing, the ascertaining, and the selecting; and applying the selected parameters to configure the dimmer to operate in a forward dimming mode or a reverse dimming mode.

C53. The computer program product of C41, C42, C43, C44, C45, C46, C47, C48, C49, C50, C51 or C52, wherein the first starting time is between 0.9 and 1.0 milliseconds after a zero-crossing of the supply of power.

C54. The computer program product of C41, C42, C43, C44, C45, C46, C47, C48, C49, C50, C51, C52 or C53, wherein the first duration of time is longer than the second duration of time.

C55. The computer program product of C41, C42, C43, C44, C45, C46, C47, C48, C49, C50, C51, C52, C53 or C54, wherein the first duration of time is between 0.8 and 1.2 milliseconds.

C56. The computer program product of C41, C42, C43, C44, C45, C46, C47, C48, C49, C50, C51, C52, C53, C54 or C55, wherein the switching circuit remains in the OFF state during a delay period between the first ending time and the second starting time.

C57. The computer program product of C56, wherein the delay period is between 100 and 200 microseconds.

C58. The computer program product of C41, C42, C43, C44, C45, C46, C47, C48, C49, C50, C51, C52, C53, C54, C55, C56 or C57, wherein the second duration of time is between 100 and 200 microseconds.

C59. The computer program product of C41, C42, C43, C44, C45, C46, C47, C48, C49, C50, C51, C52, C53, C54, C55, C56, C57 or C58, wherein based on the second current level being at least 130% of the first current level, the ascertaining ascertains that the load type is light-emitting diode (LED).

C60. The computer program product of C41, C42, C43, C44, C45, C46, C47, C48, C49, C50, C51, C52, C53, C54, C55, C56, C57, C58 or C59, wherein the switching circuit comprises a transistor.

D1. A dimmer for controlling conduction of a supply of power to a lighting load, the dimmer comprising: a line input terminal and a load output terminal, the line input terminal configured to be electrically coupled to the supply of power, and the load output terminal configured to be electrically coupled to the lighting load; a switching circuit electrically coupled in series between the line input terminal and the load output terminal, the switching circuit configured to be selectively controlled between an ON state, in which the switching circuit conducts the supply of power to the lighting load, and an OFF state; and a controller, the controller configured to perform: selectively controlling the switching circuit between the ON state and the OFF state to control dimming operation of the dimmer according to a conduction angle corresponding to a conduction time for the switching circuit to conduct the supply of power to the load during each half-phase of a plurality of half-phases of the supply of power, the conduction angle defined by a conduction start angle and a conduction stop angle, the conduction start angle being an angle of the half-phase at which the switching circuit is switched to the ON state to conduct the supply of power to the lighting load, and the conduction end angle being an angle of the half-phase at which the switching circuit is switched to the OFF state to cease conducting the supply of power to the lighting load; based on detecting an adjustment to increase the conduction angle, adjusting the selective control of the switching circuit, the adjusting comprising: increasing the conduction end angle from a first conduction end angle to a second conduction end angle greater than the first conduction end angle; and increasing the conduction start angle from a first conduction start angle to a second conduction end angle greater than the first conduction start angle, wherein the increasing the conduction end angle and the conduction start angle results in a net increase in the conduction angle; and controlling operation of the dimmer based on the adjusting.

D2. The dimmer of D1, wherein the first conduction start angle is initially substantially at a zero-crossing of the supply of power, the zero-crossing being a transition between consecutive half-phases of the supply of power.

D3. The dimmer of D1 or D2, wherein an amount of the increase in the conduction start angle from the first conduction start angle to the second conduction start angle is a fixed number of angular degrees corresponding to a fixed delay time.

D4. The dimmer of D1 or D2, wherein an amount of the increase in the conduction start angle from the first conduction start angle to the second conduction start angle is based on the second conduction end angle.

D5. The dimmer of D4, wherein the amount of the increase in the conduction start angle is a mathematical function of at least the second conduction end angle, wherein different second conduction end angles correspond to different amounts of the increase in the conduction start angle.

D6. The dimmer of D1 or D2, wherein an amount of the increase in the conduction start angle from the first conduction start angle to the second conduction start angle is based on an amount of the increase in the conduction end angle from the first conduction end angle to the second conduction end angle.

D7. The dimmer of D6, wherein the amount of the increase in the conduction angle is a mathematical function of at least the amount of the increase in the conduction end angle, wherein different amounts of increase in the conduction end angle correspond to different amount of the increase in the conduction start angle.

D8. The dimmer of D1, D2, D4, D5, D6 or D7, wherein an amount of the increase in the conduction start angle from the first conduction start angle to the second conduction start angle is forced to be no greater than a predefined maximum.

D9. The dimmer of D8, wherein the predefined maximum corresponds to between 0.9 and 1.21 milliseconds.

D10. The dimmer of D1, D2, D3, D4, D5, D6, D7, D8 or D9, wherein the adjusting is based on determining that a load type of the lighting load is light-emitting diode (LED).

D11. A method for controlling conduction of a supply of power to a lighting load, the method comprising: selectively controlling a switching circuit that is electrically coupled in series between a line input terminal configured to be electrically coupled to the supply of power and a load output terminal configured to be electrically coupled to the lighting load, the switching circuit configured to be selectively controlled between an ON state, in which the switching circuit conducts the supply of power to the lighting load, and an OFF state, the selectively controlling the switching circuit comprising selectively controlling the switching circuit between the ON state and the OFF state to control dimming operation of the dimmer according to a conduction angle corresponding to a conduction time for the switching circuit to conduct the supply of power to the load during each half-phase of a plurality of half-phases of the supply of power, the conduction angle defined by a conduction start angle and a conduction stop angle, the conduction start angle being an angle of the half-phase at which the switching circuit is switched to the ON state to conduct the supply of power to the lighting load, and the conduction end angle being an angle of the half-phase at which the switching circuit is switched to the OFF state to cease conducting the supply of power to the lighting load; based on detecting an adjustment to increase the conduction angle, adjusting the selective control of the switching circuit, the adjusting comprising: increasing the conduction end angle from a first conduction end angle to a second conduction end angle greater than the first conduction end angle; and increasing the conduction start angle from a first conduction start angle to a second conduction end angle greater than the first conduction start angle, wherein the increasing the conduction end angle and the conduction start angle results in a net increase in the conduction angle; and controlling operation of the dimmer based on the adjusting.

D12. The method of D11, wherein the first conduction start angle is initially substantially at a zero-crossing of the supply of power, the zero-crossing being a transition between consecutive half-phases of the supply of power.

D13. The method of D11 or D12, wherein an amount of the increase in the conduction start angle from the first conduction start angle to the second conduction start angle is a fixed number of angular degrees corresponding to a fixed delay time.

D14. The method of D11 or D12, wherein an amount of the increase in the conduction start angle from the first conduction start angle to the second conduction start angle is based on the second conduction end angle.

D15. The method of D14, wherein the amount of the increase in the conduction start angle is a mathematical function of at least the second conduction end angle, wherein different second conduction end angles correspond to different amounts of the increase in the conduction start angle.

D16. The method of D11 or D12, wherein an amount of the increase in the conduction start angle from the first conduction start angle to the second conduction start angle is based on an amount of the increase in the conduction end angle from the first conduction end angle to the second conduction end angle.

D17. The method of D16, wherein the amount of the increase in the conduction angle is a mathematical function of at least the amount of the increase in the conduction end angle, wherein different amounts of increase in the conduction end angle correspond to different amount of the increase in the conduction start angle.

D18. The method of D11, D12, D14, D15, D16 or D17, wherein an amount of the increase in the conduction start angle from the first conduction start angle to the second conduction start angle is forced to be no greater than a predefined maximum.

D19. The method of D18, wherein the predefined maximum corresponds to between 0.9 and 1.21 milliseconds.

D20. The method of D11, D12, D13, D14, D15, D16, D17, D18 or D19, wherein the adjusting is based on determining that a load type of the lighting load is light-emitting diode (LED).

D21. A computer program product for controlling conduction of a supply of power to a lighting load, the computer program product comprising: a computer readable storage medium readable by a processing circuit and storing instructions for execution by the processing circuit to perform a method comprising: selectively controlling a switching circuit that is electrically coupled in series between a line input terminal configured to be electrically coupled to the supply of power and a load output terminal configured to be electrically coupled to the lighting load, the switching circuit configured to be selectively controlled between an ON state, in which the switching circuit conducts the supply of power to the lighting load, and an OFF state, the selectively controlling the switching circuit comprising selectively controlling the switching circuit between the ON state and the OFF state to control dimming operation of the dimmer according to a conduction angle corresponding to a conduction time for the switching circuit to conduct the supply of power to the load during each half-phase of a plurality of half-phases of the supply of power, the conduction angle defined by a conduction start angle and a conduction stop angle, the conduction start angle being an angle of the half-phase at which the switching circuit is switched to the ON state to conduct the supply of power to the lighting load, and the conduction end angle being an angle of the half-phase at which the switching circuit is switched to the OFF state to cease conducting the supply of power to the lighting load; based on detecting an adjustment to increase the conduction angle, adjusting the selective control of the switching circuit, the adjusting comprising: increasing the conduction end angle from a first conduction end angle to a second conduction end angle greater than the first conduction end angle; and increasing the conduction start angle from a first conduction start angle to a second conduction end angle greater than the first conduction start angle, wherein the increasing the conduction end angle and the conduction start angle results in a net increase in the conduction angle; and controlling operation of the dimmer based on the adjusting.

D22. The computer program product of D21, wherein the first conduction start angle is initially substantially at a zero-crossing of the supply of power, the zero-crossing being a transition between consecutive half-phases of the supply of power.

D23. The computer program product of D21 or D22, wherein an amount of the increase in the conduction start angle from the first conduction start angle to the second conduction start angle is a fixed number of angular degrees corresponding to a fixed delay time.

D24. The computer program product of D21 or D22, wherein an amount of the increase in the conduction start angle from the first conduction start angle to the second conduction start angle is based on the second conduction end angle.

D25. The computer program product of D24, wherein the amount of the increase in the conduction start angle is a mathematical function of at least the second conduction end angle, wherein different second conduction end angles correspond to different amounts of the increase in the conduction start angle.

D26. The computer program product of D21 or D22, wherein an amount of the increase in the conduction start angle from the first conduction start angle to the second conduction start angle is based on an amount of the increase in the conduction end angle from the first conduction end angle to the second conduction end angle.

D27. The computer program product of D26, wherein the amount of the increase in the conduction angle is a mathematical function of at least the amount of the increase in the conduction end angle, wherein different amounts of increase in the conduction end angle correspond to different amount of the increase in the conduction start angle.

D28. The computer program product of D21, D22, D24, D25, D26 or D27, wherein an amount of the increase in the conduction start angle from the first conduction start angle to the second conduction start angle is forced to be no greater than a predefined maximum.

D29. The computer program product of D28, wherein the predefined maximum corresponds to between 0.9 and 1.21 milliseconds.

D30. The computer program product of claim D21, D22, D23, D24, D25, D26, D27, D28 or D29, wherein the adjusting is based on determining that a load type of the lighting load is light-emitting diode (LED).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A dimmer for controlling conduction of a supply of power to a lighting load, the dimmer comprising:
    a line input terminal and a load output terminal, the line input terminal configured to be electrically coupled to the supply of power, and the load output terminal configured to be electrically coupled to the lighting load;
    a switching circuit electrically coupled in series between the line input terminal and the load output terminal, the switching circuit configured to be selectively controlled between an ON state, in which the switching circuit conducts the supply of power to the lighting load, and an OFF state; and
    a controller, the controller configured to perform:
        based on detecting an adjustment to increase a conduction angle of the dimmer, the conduction angle corresponding to a conduction time of the switching circuit to conduct the supply of power to the load, adjusting parameters of the selective control of the switching circuit, the adjusting increasing the conduction angle;
        concurrent with the adjusting, monitoring a voltage of a power supply of the dimmer, the voltage initially being substantially a first voltage;
        based on the monitoring detecting that the voltage falls from substantially the first voltage to a second, lower voltage, establishing a maximum conduction angle for the dimmer, the maximum conduction angle being a function of (i) the conduction angle of the dimmer when the voltage is detected to have fallen to the second voltage and (ii) an offset; and
        controlling operation of the dimmer using the established maximum conduction angle.

2. The dimmer of claim 1, wherein the establishing the maximum conduction angle sets the maximum conduction angle at the conduction angle of the dimmer when the voltage is detected to have fallen to the second voltage minus the offset.

3. The dimmer of claim 1, wherein the offset is a predetermined number of angular degrees.

4. The dimmer of claim 1, wherein the offset is a fixed percentage of the conduction angle of the dimmer when the voltage is detected to have fallen to the second voltage.

5. The dimmer of claim 1, wherein the establishing the maximum conduction angle comprises decreasing an angle at which the switching circuit is configured to be selectively controlled to switch to the OFF state.

6. The dimmer of claim 1, wherein the establishing the maximum conduction angle comprises increasing an angle at which the switching circuit is configured to be selectively controlled to switch to the ON state.

7. The dimmer of claim 1, wherein the first voltage is a voltage value and wherein substantially the first voltage is defined to be within 5% of the voltage value.

8. The dimmer of claim 1, wherein the second voltage is a predetermined voltage lower than the first voltage, the predetermined voltage being set as a function of the first voltage.

9. A dimmer for controlling conduction of a supply of power to a lighting load, the dimmer comprising:
    a line input terminal and a load output terminal, the line input terminal configured to be electrically coupled to the supply of power, and the load output terminal configured to be electrically coupled to the lighting load;
    a switching circuit electrically coupled in series between the line input terminal and the load output terminal, the switching circuit configured to be selectively controlled between an ON state, in which the switching circuit conducts the supply of power to the lighting load, and an OFF state;
    a controller; and
    a dimming level adjustment circuit electrically coupled between a dimmer power supply voltage and the controller of the dimmer, wherein the dimming level adjustment circuit is configured to provide a dimming level signal to the controller, the dimming level signal indicating a desired dimming level for the dimmer, wherein a maximum value of the dimming level signal, and therefore a maximum configurable desired dimming level for the dimmer, is based on the dimmer power supply voltage, wherein the controller is configured to perform:
        receiving the dimming level signal from the dimming level adjustment circuit; and
        setting a dimming level for the dimmer based on the received dimming level signal.

10. The dimmer of claim 9, wherein based on the dimming level adjustment circuit being adjusted to increase the dimming level signal being provided to the controller, the maximum value of the dimming level signal is reached and limited by the dimmer power supply voltage, wherein based on further adjustment to the dimming level adjustment circuit to increase the dimming level signal, the dimming level signal remains at the maximum value of the dimming level signal.

11. The dimmer of claim 10, wherein the dimming level adjustment circuit comprises a potentiometer.

12. A dimmer for controlling conduction of a supply of power to a lighting load, the dimmer comprising:
    a line input terminal and a load output terminal, the line input terminal configured to be electrically coupled to the supply of power, and the load output terminal configured to be electrically coupled to the lighting load;

a switching circuit electrically coupled in series between the line input terminal and the load output terminal, the switching circuit configured to be selectively controlled between an ON state, in which the switching circuit conducts the supply of power to the lighting load, and an OFF state; and a controller, the controller configured to perform:

selectively controlling the switching circuit between the ON state and the OFF state to control dimming operation of the dimmer according to a conduction angle corresponding to a conduction time for the switching circuit to conduct the supply of power to the load during each half-phase of a plurality of half-phases of the supply of power, the conduction angle defined by a conduction start angle and a conduction stop angle, the conduction start angle being an angle of the half-phase at which the switching circuit is switched to the ON state to conduct the supply of power to the lighting load, and the conduction end angle being an angle of the half-phase at which the switching circuit is switched to the OFF state to cease conducting the supply of power to the lighting load;

based on detecting an adjustment to increase the conduction angle, adjusting the selective control of the switching circuit, the adjusting comprising:

increasing the conduction end angle from a first conduction end angle to a second conduction end angle greater than the first conduction end angle; and increasing the conduction start angle from a first conduction start angle to a second conduction end angle greater than the first conduction start angle, wherein the increasing the conduction end angle and the conduction start angle results in a net increase in the conduction angle; and controlling operation of the dimmer based on the adjusting.

13. The dimmer of claim 12, wherein the first conduction start angle is initially substantially at a zero-crossing of the supply of power, the zero-crossing being a transition between consecutive half-phases of the supply of power.

14. The dimmer of claim 12, wherein an amount of the increase in the conduction start angle from the first conduction start angle to the second conduction start angle is a fixed number of angular degrees corresponding to a fixed delay time.

15. The dimmer of claim 12, wherein an amount of the increase in the conduction start angle from the first conduction start angle to the second conduction start angle is based on the second conduction end angle.

16. The dimmer of claim 15, wherein the amount of the increase in the conduction start angle is a mathematical function of at least the second conduction end angle, wherein different second conduction end angles correspond to different amounts of the increase in the conduction start angle.

17. The dimmer of claim 12, wherein an amount of the increase in the conduction start angle from the first conduction start angle to the second conduction start angle is based on an amount of the increase in the conduction end angle from the first conduction end angle to the second conduction end angle.

18. The dimmer of claim 17, wherein the amount of the increase in the conduction angle is a mathematical function of at least the amount of the increase in the conduction end angle, wherein different amounts of increase in the conduction end angle correspond to different amount of the increase in the conduction start angle.

19. The dimmer of claim 12, wherein an amount of the increase in the conduction start angle from the first conduction start angle to the second conduction start angle is forced to be no greater than a predefined maximum.

20. The dimmer of claim 19, wherein the predefined maximum corresponds to between 0.9 and 1.21 milliseconds.

21. The dimmer of claim 12, wherein the adjusting is based on determining that a load type of the lighting load is light-emitting diode (LED).

\* \* \* \* \*